US009998683B2

(12) United States Patent
Fujikawa et al.

(10) Patent No.: US 9,998,683 B2
(45) Date of Patent: Jun. 12, 2018

(54) IMAGE PROCESSING DEVICE AND IMAGE PROCESSING PROGRAM

(71) Applicant: OMRON Corporation, Kyoto-shi (JP)

(72) Inventors: Masahiro Fujikawa, Nara (JP); Koji Shimada, Ayabe (JP); Kakuto Shirane, Moriyama (JP); Katsuhiro Shimoda, Ootsu (JP); Yoshihiro Moritoki, Nagaoka (JP); Yasuyuki Ikeda, Kyoto (JP); Hiroyuki Hazeyama, Shanghai (CN)

(73) Assignee: OMRON Corporation, Kyoto-shi (JP)

( * ) Notice: Subject to any disclaimer, the term of this patent is extended or adjusted under 35 U.S.C. 154(b) by 459 days.

(21) Appl. No.: 13/975,424

(22) Filed: Aug. 26, 2013

(65) Prior Publication Data
US 2014/0015956 A1 Jan. 16, 2014

Related U.S. Application Data

(63) Continuation of application No. PCT/JP2011/056775, filed on Mar. 22, 2011.

(30) Foreign Application Priority Data

Mar. 15, 2011 (JP) ................................ 2011-056439

(51) Int. Cl.
*H04N 5/262* (2006.01)
*G06T 3/40* (2006.01)
*G06T 7/73* (2017.01)

(52) U.S. Cl.
CPC ......... *H04N 5/2621* (2013.01); *G06T 3/4038* (2013.01); *G06T 7/74* (2017.01);
(Continued)

(58) Field of Classification Search
CPC ....... H04N 5/2621; G06T 7/74; G06T 3/4038; G06T 2207/10016; G06T 2207/30164; G01B 2210/52
(Continued)

(56) References Cited

U.S. PATENT DOCUMENTS

| 5,481,479 A * | 1/1996 | Wight .................... H04N 3/30 348/144 |
| 6,005,987 A * | 12/1999 | Nakamura ............ G06T 3/4038 348/42 |
| 2002/0024612 A1* | 2/2002 | Gyoten ................ H04N 9/3147 348/383 |
| 2008/0036873 A1 | 2/2008 | Silver |

(Continued)

FOREIGN PATENT DOCUMENTS

| EP | 2197199 A2 | 6/2010 |
| JP | H05-260264 A | 10/1993 |

(Continued)

*Primary Examiner* — Andy Rao
*Assistant Examiner* — Jimmy S Lee
(74) *Attorney, Agent, or Firm* — Metrolexis Law Group, PLLC

(57) ABSTRACT

An image processing device is connected to an imaging unit. The imaging unit has an overlapping region in an imaging range before and after continuous imaging. The image processing device includes: an interface that receives a plurality of captured images obtained by the imaging unit; a measurement unit configured to acquire a measurement result of a subject in the captured image by performing measurement processing to the captured image; a synthesis unit configured to generate a synthesized image by synthesizing the plurality of captured images such that the captured images overlap with one another within an overlapping range corresponding to the overlapping region in imaging order; and an output unit configured to output the synthesized image, information indicating the overlapping range correlated with the synthesized image, and information indicating the measurement result.

18 Claims, 26 Drawing Sheets

(52) U.S. Cl.
CPC .............................. *G01B 2210/52* (2013.01);
*G06T 2207/10016* (2013.01); *G06T 2207/30164* (2013.01)

(58) Field of Classification Search
USPC .......................................................... 348/86
See application file for complete search history.

(56) References Cited

U.S. PATENT DOCUMENTS

| | | | |
|---|---|---|---|
| 2010/0020190 A1* | 1/2010 | Kawakatsu | G06T 3/4038 348/222.1 |
| 2001/0148066 | 6/2010 | Stratmann et al. | |
| 2010/0149358 A1* | 6/2010 | Shioya | G06T 3/4038 348/218.1 |
| 2010/0226561 A1 | 9/2010 | Fujikawa et al. | |
| 2010/0309308 A1 | 12/2010 | Saphier et al. | |
| 2010/0321470 A1* | 12/2010 | Oshima | G03B 17/18 348/36 |
| 2011/0025865 A1* | 2/2011 | Kunishige | H04N 5/232 348/220.1 |
| 2011/0082586 A1* | 4/2011 | Nishihara | B25J 9/0093 700/259 |

FOREIGN PATENT DOCUMENTS

| | | |
|---|---|---|
| JP | H07-048018 A | 2/1995 |
| JP | 2002-113679 A | 4/2002 |
| JP | 2008-098754 A | 4/2008 |
| JP | 2010-081229 A | 4/2010 |
| JP | 2010-191939 A | 9/2010 |
| WO | 2009/148089 A1 | 12/2009 |
| WO | WO 2009148089 A1 * 12/2009 | ............ B25J 9/0093 |

* cited by examiner

Fig. 25

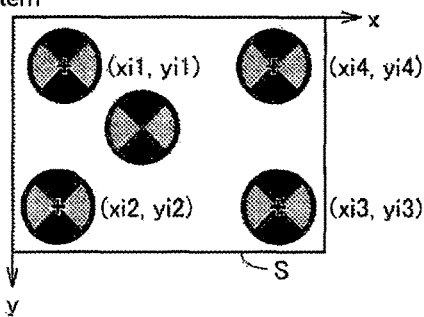

124c

| Parameter | Format | Meaning |
|---|---|---|
| xi1, yi1<br>xi2, yi2<br>xi3, yi3<br>xi4, yi4 | Real number [pixel] | Image coordinates at four points of target pattern |
| E1<br>E2<br>E3 | Integral number [pulses] | Encoder count value<br>E1: at beginning of calibration<br>E2: when conveyer is moved to robot operating range (upstream side)<br>E3: when conveyer is moved to robot operating range (downstream side) |
| X1, Y1<br>X2, Y2<br>X3, Y3<br>X4, Y4 | Real number [mm] | Robot coordinates at four points of target pattern when conveyer is moved to robot operating range (upstream side) |
| X5, Y5 | Real number [mm] | Robot coordinate of mark 1 of target pattern when conveyer is moved to robot operating range (downstream side) |
| dX<br>dY | Real number [mm/pulse] | Distance in which conveyer moves in X-direction and Y-direction every pulse of encoder<br>$dX = (X5 - X1)/(E3 - E2)$<br>$dY = (Y5 - Y1)/(E3 - E2)$ |
| A, B, C,<br>D, E, F | Real number | Parameter used to convert mage coordinate system into robot coordinate system<br>$X = A \cdot xi + B \cdot yi + C$<br>$Y = D \cdot xi + E \cdot yi + F$ |

IMAGE PROCESSING DEVICE AND IMAGE PROCESSING PROGRAM

CROSS REFERENCE TO RELATED APPLICATIONS

This application is a Continuation of PCT Application No. PCT/JP2011/056775 filed on Mar. 22, 2011, and claims the priority of Japanese Patent Application No. 2011-0056439 filed on Mar. 15, 2011, entitled "IMAGE PROCESSING DEVICE AND IMAGE PROCESSING PROGRAM," the entire contents of both of which are incorporated herein by reference.

TECHNICAL FIELD

This disclosure relates to an image processing device and an image processing program, for being aimed at conveyer tracking.

BACKGROUND ART

For the purpose of saving labor, a technology is frequently used to control various processes using image processing in the field of factory automation (FA). A working process of tracking and holding a workpiece using a moving machine (hereinafter referred to as an "industrial robot" or simply as a "robot") while conveying the workpiece with a conveying device, such as a belt conveyer, can be cited as an example of image processing technology. The working process is called conveyer tracking.

In conveyer tracking technology, an imaging device captures an image of the workpiece on the conveying device. An image processing device then performs measurement processing, such as pattern matching and binarization processing, to the image obtained by the imaging, thereby identifying the position in which each workpiece exists. A robot tracks and holds each workpiece based on the identified position.

For example, in a tracking method disclosed in Patent Document 1 (Japanese Unexamined Patent Publication No. 2002-113679), the images of the plural workpieces conveyed by a conveying body are captured, and handling of the workpieces is controlled based on a position coordinate of each workpiece recognized from the imaging result. More specifically, in a configuration of the tracking method of Patent Document 1, the images of an imaging region of imaging means and a subsequent imaging region are continuously captured within a certain width into which a whole shape of the workpiece fits, while overlapping with each other in the traveling direction. The position coordinate is recognized of only the workpiece including the whole shape in the imaging region.

It is considered that a panoramic image synthesized by utilizing an overlapping portion of the imaging regions is effectively used to look down at the whole state on the conveying route using the continuously-captured images.

Although it is not aimed at the conveyer tracking, Patent Document 2 (Japanese Unexamined Patent Publication No. 5-260264) discloses an image processing device wherein the panoramic image, in the range where an operator captures the images, is generated by joining plural frames, with the operator continuously capturing the images by performing a panning of a hand-held camera.

SUMMARY OF THE INVENTION

The panoramic image generated with the image processing device of Patent Document 2 is not the workpiece on the conveying device, and is not correlated with measurement information on the workpiece.

An object of an embodiment of the invention is to provide an image processing device and an image processing program for outputting information to assist the operator by using the captured image to understand the state on the route through which the workpiece is conveyed.

An aspect of the invention is an image processing device connected to an imaging unit. The imaging unit has an overlapping region in an imaging range before and after the continuous imaging. The image processing device includes: an interface that receives plural captured images obtained by the imaging unit; a measurement unit configured to acquire a measurement result of a subject in the captured image by performing measurement processing to the captured image; a synthesis unit configured to generate a synthesized image by synthesizing the plural captured images such that the captured images overlap with one another within an overlapping range corresponding to the overlapping region in an imaging order; and an output unit configured to output the synthesized image information indicating the overlapping range correlated with the synthesized image, and information indicating the measurement result.

The output unit may output the information indicating the overlapping range and the measurement result while superimposing this information on the synthesized image.

The output unit may vary an output mode of each captured image in the synthesized image.

The image processing device may further include an operation input unit that externally receives an operation. The output unit may output the captured image selected by the operation input unit in the synthesized image while enlarging the captured image.

The image processing device may further include a selection unit configured to select the measurement result that is designated by the operation received by the operation input unit from the measurement results corresponding to the captured images. The output unit outputs the synthesized image, the synthesized image including the captured image corresponding to the measurement result selected by the selection unit and captured images captured before and after the captured image.

The output unit may select the captured image designating a value in which the corresponding measurement result is previously specified from the captured images in the synthesized image, and output the selected captured image.

The output unit may differentiate the output mode of the measurement result corresponding to the captured image in which the imaging order is odd-numbered from the output mode of the measurement result corresponding to the captured image in which the imaging order is even-numbered in the captured images in the synthesized image.

The image processing device may further include an output unit configured to output information on a time necessary or the measurement processing performed by the measurement unit.

The information on the necessary time may be a ratio of the time necessary for the captured image measurement processing to a time interval before and after the continuous imaging.

The ratio may be acquired with respect to each captured image of the synthesized image, and the ratio may be outputted while correlated with the synthesized image and with each captured image of the synthesized image.

Another aspect of the invention is an image processing program to be executed by a computer connected to an imaging unit that has an overlapping region in an imaging range before and after the continuous imaging.

The image processing program causes the computer to act as: an interface that receives plural captured images obtained by the imaging unit; a measurement unit configured to acquire a measurement result of a subject in the captured image by performing measurement processing to the captured image; a synthesis unit configured to generate a synthesized image by synthesizing the plurality of captured images such that the captured images overlap with one another within an overlapping range corresponding to the overlapping region in an imaging order; and an output unit configured to output the synthesized image information indicating the overlapping range correlated with the synthesized image, and information indicating the measurement result.

According to the above aspects, the operator can acquire the information with an understanding of the state along the route through which the workpiece is conveyed.

BRIEF DESCRIPTION OF THE DRAWINGS

FIG. 25 is a view illustrating an example of a parameter set acquired by the calibration according to the third embodiment of the invention.

DETAILED DESCRIPTION

Figure 1:
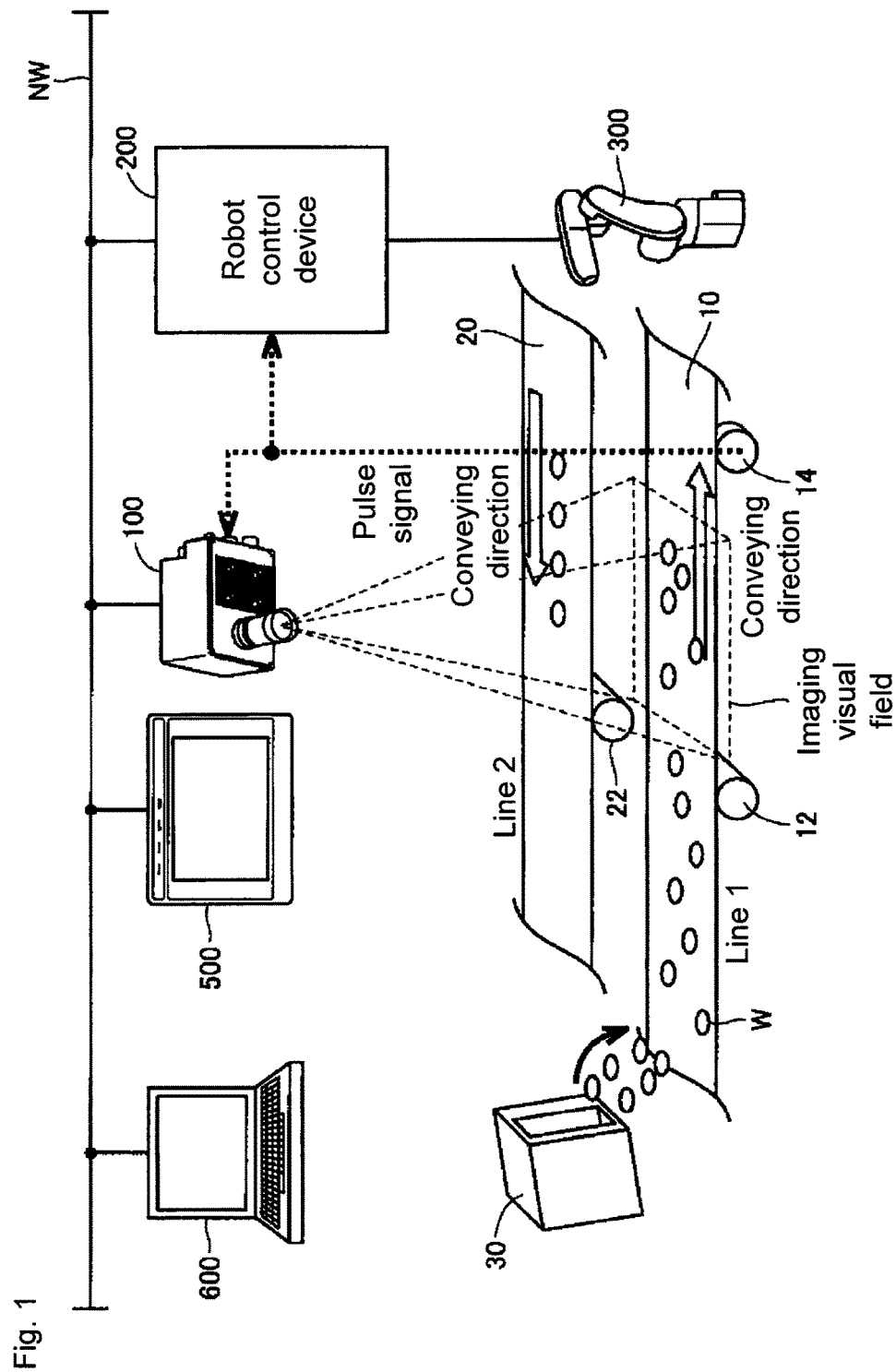
FIG. 1 is a schematic diagram illustrating a configuration of a conveyer tracking system using a visual sensor according to a first embodiment of the invention.

Hereinafter, embodiments of the invention will be described with reference to the drawings. In the drawings, the identical or equivalent component is designated by the identical reference numeral, and overlapping description is not repeated for sake of brevity.

First Embodiment

FIG. 1 is a schematic diagram illustrating a configuration of a conveyer tracking system using a visual sensor according to a first embodiment of the invention. The conveyer tracking system in FIG. 1 includes two conveying devices (conveyers) 10 and 20. The conveyers 10 and 20 are rotated by driving rollers 12 and 22, respectively. Hereinafter, the conveyers 10 and 20 are also referred to as a line 1 and a line 2. In the example in FIG. 1, the line 1 moves to a right side, and the line 2 moves to a left side. A discharging device 30 or the like randomly supplies a workpiece W to the line 1 from the left side. The workpiece W on the line 1 moves from the left to the right. Typically, foods such as a sweet stuff or various tablets are considered as the workpiece W.

A visual sensor 100 of the first embodiment is provided in a predetermined position above the line 1. An imaging unit that captures an image of a subject such as the workpiece, and a captured image processing unit that processes the image captured by the imaging unit, are integrally formed in the visual sensor 100. Alternatively, the imaging unit and the captured image processing unit may be formed separately.

In the visual sensor 100, an imaging visual field is set so to include the entire width direction (a direction orthogonal to a conveying direction) of the line 1. The imaging visual field can be determined by setting an angle of view (or a view angle) of the imaging unit (camera). In the description, the imaging visual field corresponds to a range where the image can be captured with the imaging unit, and sometimes the imaging visual field is called an "imaging range".

The visual sensor 100, which is set such that the imaging range is obtained, continuously captures the image in a predetermined period to be able to sequentially capture the image of the workpiece W flowing on the line 1. The visual sensor 100 performs measurement processing, such as pattern matching, to the sequentially-captured image, thereby performing a positioning of each workpiece and a tracking processing. Thus, the imaging unit (imaging unit 110 in FIG. 2) of the visual sensor 100 is disposed so as to capture the image of the workpiece W conveyed on the conveyer 10 that is the conveying device. A captured image processing unit 120 (see FIG. 2) that processes the captured image is connected to the imaging unit 110.

A robot 300, which moves the workpiece W to the line 2 while holding the workpiece W, is disposed on a downstream side of the visual sensor 100 in the conveying direction of the line 1. The robot 300 includes an arm in order to hold the workpiece W, and the robot 300 moves the arm to a target position to hold the workpiece W on the line 1. That is, the robot 300 is disposed on the downstream side of the imaging range of the imaging unit of the visual sensor 100 in a conveying route of the conveyer 10 (the line 1), and the robot 300 corresponds to the moving machine that handles the workpiece W. More specifically, the robot 300 positions the arm onto the target workpiece W, picks up the workpiece W, and aligns the workpiece W on the line 2.

The robot 300 is disposed on a moving mechanism (not illustrated) that moves the robot 300 along the line 1, and the robot 300 moves across a predetermined range. The moving range of the robot 300 is also called a tracking range.

The tracking processing and the positioning processing of the robot 300 are controlled using a detection result of an encoder 14 provided in the line 1. Typically, a rotary encoder is used as the encoder 14, and a pulse signal is generated in association with the rotation. The number of rotations of a roller coupled to the conveyer 10 (the line 1), namely, the pulse signals generated by the encoder 14, corresponds to a signal indicating a travel distance along the conveying route of the conveyer 10, that is, of the conveying device, by counting the number of pulses of the generated pulse signal. The travel distance of the conveyer 10 is calculated based on the pulse signal.

The robot 300 performs an action in response to an instruction from a robot control device 200. That is, the robot control device 200 is the control device that controls robot 300 of the moving machine. The robot control device 200 is connected to the visual sensor 100 through a network NW, and provides an instruction necessary for the action for robot 300 to hold the workpiece W based on the position of each workpiece W detected by the visual sensor 100.

An operation display device 500, and a support device 600 that has a function equivalent to a personal computer, are connected to the network NW in addition to the visual sensor 100 and the robot control device 200. The operation display device 500 displays a processing result from the visual sensor 100 and an action state of the robot 300 from the robot control device 200, and provides various instruction to the visual sensor 100 and/or the robot control device 200 in response to a user's operation.

In the conveyer tracking system in FIG. 1, there is a potential need to further enhance a line speed (a conveying speed) in order to improve productivity. To meet this need, the pulse signal generated by the encoder 14 is inputted to not only the robot control device 200, but also to visual sensor 100 in the configuration of the conveyer tracking system of the first embodiment. The visual sensor 100 and the robot control device 200 acquire the positional information on the target conveying device (the conveyer) while synchronizing with each other. This allows the action to be performed while communication is conducted between robot control device 200 and the visual sensor 100 through the network NW. At this point, the detailed action control by which the robot control device 200 and the visual sensor 100 are synchronized with each other is not given.

<Imaging Action and Travel Distance>

The imaging action and the travel distance of the visual sensor 100 in the conveyer system in FIG. 1 will be described below.

The visual sensor 100 captures the image of the line 1. The imaging action of the visual sensor 100 is started in response to an imaging instruction from the robot control device 200. The imaging instruction is transmitted through the network NW that connects the visual sensor 100 and the robot control device 200. Typically, general-purpose networks such as Ethernet (registered trademark) can be used as the network NW.

The visual sensor 100 is configured to receive the imaging instruction from the robot control device 200, and starts the imaging in response to the imaging instruction. Therefore, the visual sensor 100 sequentially acquires the image in which the imaging visual field is taken. The visual sensor 100 performs the measurement processing to the image. The visual sensor 100 transmits the positional information on the workpiece W during the imaging to the robot control device 200. The positional information on the workpiece W during the imaging is obtained by the measurement processing. Thus, the visual sensor 100 performs the measurement processing to the image obtained by the imaging of the imaging unit, thereby obtaining the positional information on the region corresponding to the previously-registered workpiece in the image.

More specifically, the robot control device 200 counts the number of pulses included in the pulse signal from the encoder 14, and transmits the imaging instruction to the visual sensor 100 through the network NW when the number of pulses inputted is greater than or equal to a predetermined value.

The positional information on each workpiece W is transmitted from the visual sensor 100 to the robot control device 200 through the network NW. Using the received positional information, the robot control device 200 provides to robot 300 the instruction necessary for the holding action. At this point, the detailed holding action of the robot 300 is not given.

The pulse signal, which is generated according to the detection result of the encoder 14 provided in the line 1, is configured to be inputted to the visual sensor 100 and the robot control device 200. Each of the visual sensor 100 and the robot control device 200 includes an encoder counter that counts the number of pulses included in the pulse signal. Because the pulse signal is concurrently inputted from the encoder 14 to the visual sensor 100 and the robot control device 200, when the encoder counters are initialized (the counters are reset) at the same time, the counter value of the subsequently-inputted pulse signal is the same value, and the counter values, therefore, are synchronized with each other.

More specifically, the travel distance of the conveyer per pulse included in the pulse signal from the encoder 14 is previously set to both the visual sensor 100 and the robot control device 200. Identical parameters (such as a counter maximum value, a counter minimum value, and an increasing value per pulse) are set to the encoder counters of the visual sensor 100 and the robot control device 200. That is, with respect to the counting, the identical parameters are set between the encoder counter of the visual sensor 100 and the encoder counter of the robot control device 200.

The counter values of the encoder counter are initialized to zero before a production line operates. That is, the encoder counters of the visual sensor 100 and the robot control device 200 are reset before the counting of the number of pulses included in the pulse signal is started.

In the first embodiment, means for retaining the travel distance in the conveying route of the conveyer 10 is implemented while the visual sensor 100 and the robot control device 200 synchronize with each other.

<Hardware Configuration>

Figure 2:
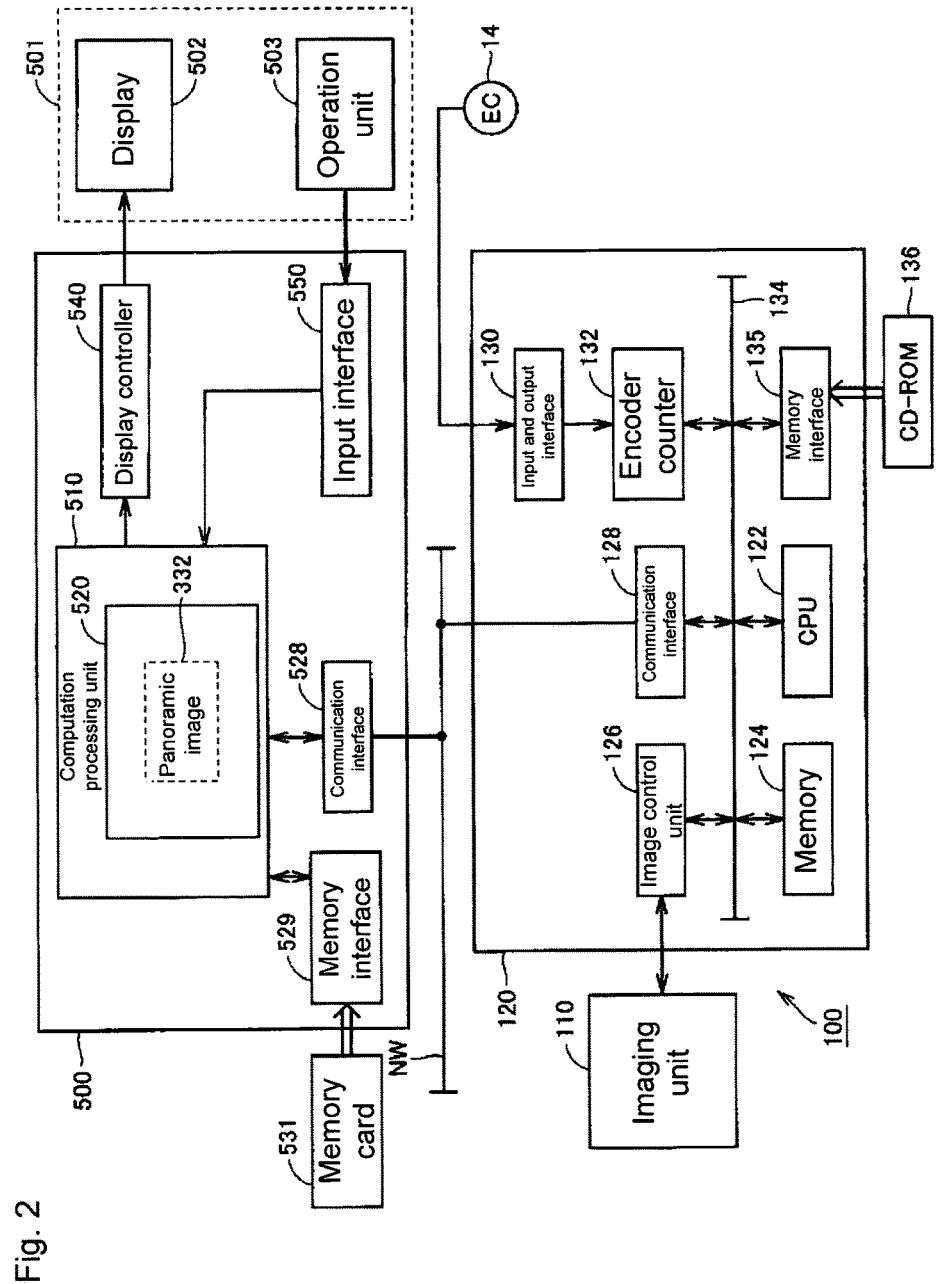
FIG. 2 is a schematic diagram illustrating a hardware configuration of the conveyer tracking system using the visual sensor according to the first embodiment of the invention.

FIG. 2 is a schematic diagram illustrating a hardware configuration of the conveyer tracking system using the visual sensor according to the first embodiment of the invention. Referring to FIG. 2, the visual sensor 100 includes the imaging unit 110 and the captured image processing unit 120. The captured image processing unit 120 conducts communication with the operation display device 500. The robot control device 200 and the support device 600 are not illustrated in FIG. 2.

In FIG. 2, the image processing device that receives and processes the captured image obtained by the imaging of the imaging unit 110 includes the captured image processing unit 120 and the operation display device 500. Alternatively, the support device 600 may include the function of the operation display device 500. In this case, the image processing device is configured to include the functions of the captured image processing unit 120 and the support device 600.

The imaging unit 110 is a device that captures the image of the subject existing in the imaging visual field. The imaging unit 110 includes an optical system, such as a lens and a diaphragm and a light receiving element such as a CCD (Charge Coupled Device) image sensor and a CMOS (Complementary Metal Oxide Semiconductor) image sensor, as the main structural element. The imaging unit 110 performs the imaging in response to the instruction from the captured image processing unit 120, and outputs the image data obtained by the imaging to the captured image processing unit 120.

The captured image processing unit 120 includes a CPU (Central Processing Unit) 122, a memory 124, an image control unit 126, a communication interface (interface) 128, an input and output interface (interface) 130, an encoder counter 132, and a memory interface (interface) 135 in which a CD-ROM (Compact Disk-Read Only Memory) 136, as an example of a detachable recording medium, is loaded. These components are connected to one another through a bus 134 so as to be able to conduct data communication with one another.

The CPU 122 is a processor that performs the main calculation in the captured image processing unit 120. Various programs executed by the CPU 122, the image data captured by the imaging unit 110, and various parameters are stored in the memory 124. Typically, the memory 124 includes a volatile storage device such as a DRAM (Dynamic Random Access Memory) and a nonvolatile storage device such as a FLASH memory.

The image control unit 126 performs the imaging action in the connected imaging unit 110 in response to an internal command from the CPU 122 or the like. The image control unit 126 includes an interface that transmits various commands to the imaging unit 110 and an interface that receives the image data from the imaging unit 110.

The communication interface 128 exchanges various pieces of data with operation display device 500. Typically, the visual sensor 100 and the operation display device 500 are connected to each other through an Ethernet (registered trademark) connection, and the communication interface 128 is hardware compliant with the Ethernet (registered trademark) connection.

The input and output interface 130 outputs various signals to the outside from the captured image processing unit 120, and inputs various signals from the outside. In particular, the input and output interface 130 receives the pulse signal generated by the encoder 14, converts the pulse signal into a digital signal, and outputs the digital signal to the encoder counter 132.

The encoder counter 132 counts the number of pulses included in the pulse signal from the encoder 14, and outputs a count value. The encoder counter 132 performs this count independently of any calculation of the CPU 122.

On the other hand, the operation display device 500 includes a computation processing unit 510 that contains a memory 520, a communication interface (interface) 528, an input and output interface (interface) 550, a display controller 540 that controls the display of an external display 502, such as a liquid crystal display. The computation processing unit 510 also contains an input interface (interface) 550 that receives an operation instruction from an operation unit 503 that is constructed with a button and a switch operated by the operator, and a memory interface (interface) 529 in which a detachable recording medium, such as a memory card 531, is mounted. These components are controlled by various processors, such as a display DSP (Digital Signal Processor).

In the first embodiment, the display 502 and the operation unit 503 are provided as separate components. Alternatively, display 502 and the operation unit 503 are integrally constructed, such as in a touch panel.

The computation processing unit 510 receives the image data from the visual sensor 100 and controls the display controller 540 using the received image data. This control causes the display 502 to display the image or to input the instruction provided by operation of the operation unit 503 through input interface 550. The image data received from the visual sensor 100 is stored in the memory 220. The measurement result of workpiece W detected by the measurement processing of the visual sensor 100 is also stored in the memory 220.

The communication interface (interface) 528 exchanges various pieces of data with the captured image processing unit 120 of the visual sensor 100. Typically, the visual sensor 100 and the operation display device 500 are connected to each other through an Ethernet (registered trademark) connection, and the communication interface 528 is hardware compliant with the Ethernet (registered trademark) connection.

<Functional Configuration>

Figure 3:
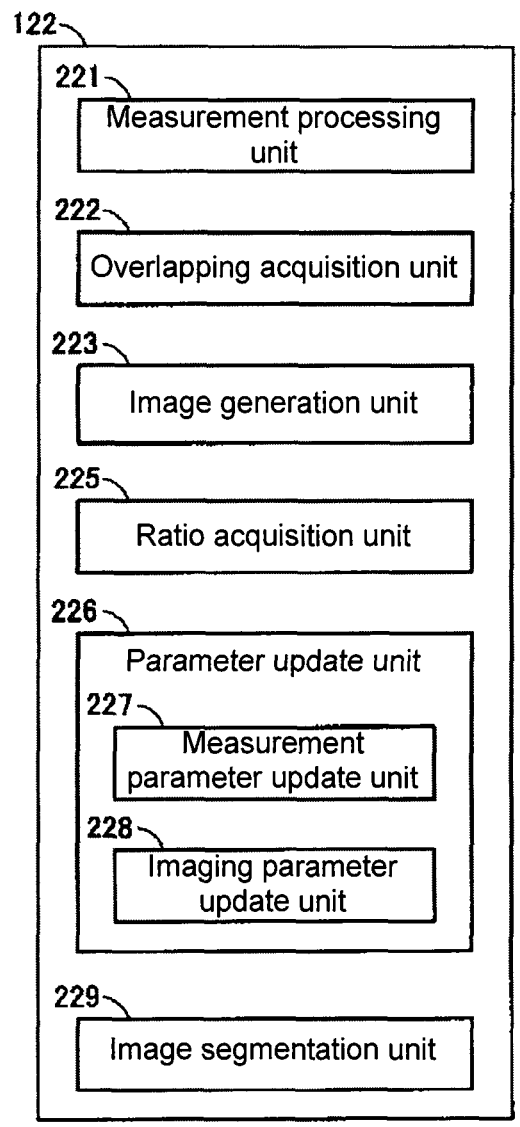
FIG. 3 is a schematic diagram illustrating a functional configuration of the captured image processing according to the first embodiment of the invention.
Figure 4:
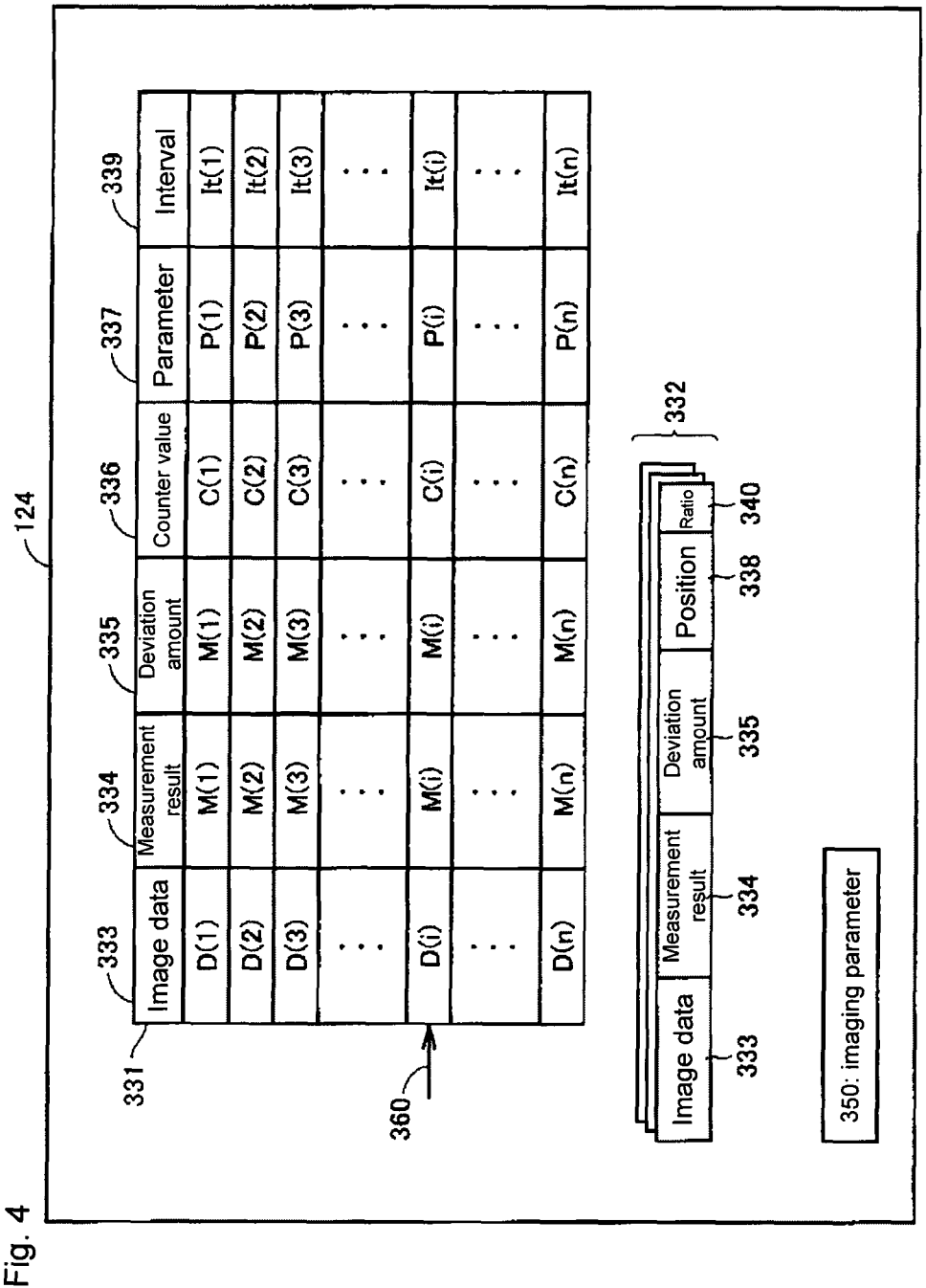
FIG. 4 is a schematic diagram illustrating a data storage content of the captured image processing according to the first embodiment of the invention.

FIG. 3 is a schematic diagram illustrating a functional configuration of the captured image processing according to the first embodiment of the invention. FIG. 4 is a schematic diagram illustrating a data storage content of the captured image processing according to the first embodiment of the invention.

It is assumed that each function in FIG. 3 is implemented by having the CPU 122 of the captured image processing unit 120 execute the program previously stored in the memory 124. Alternatively, each function may be implemented by not only the program, but by a combination of the program and a circuit.

Various programs executed by the captured image processing unit 120 are distributed while stored in the CD-ROM 136. The programs stored in the CD-ROM 136 are read by the memory interface 135 having a CD-ROM (Compact Disk-Read Only Memory) drive function, and stored in the memory 124 and the like. Alternatively, the program may be downloaded from an upper-level host computer through the network NW.

In the first embodiment, while the workpiece W is being conveyed on the line 1, the imaging unit 110 connects the pieces of image data acquired by continuously capturing the imaging range, thereby generating the image corresponding to a full view of the imaging range from upstream to downstream on the line 1. The image corresponding to the full view is called a panoramic image.

A function of CPU 122 is to process the panoramic image. Specifically, the CPU 122 includes a measurement processing unit 221 that performs the workpiece measurement processing to the captured image, an overlapping acquisition unit 222 that acquires an overlapping range between the images of the panoramic image, an image generation unit 223 that generates the panoramic image in which the images overlap with each other in the overlapping range, a ratio acquisition unit 225 that acquires a ratio of a time necessary for the measurement processing to an imaging interval, a parameter update unit 226 that updates various parameters (types and/or values of parameters), and an image division unit 229 that divides the panoramic image into the captured images.

The parameter update unit 226 includes a measurement parameter update unit 227 that updates the parameter related to the measurement processing and an imaging parameter update unit 228 that updates the parameter related to the imaging interval.

A typical example of the measurement processing used is a search processing in which pattern matching is used based on a model image of the previously-registered workpiece W. In the search processing, a feature portion of the workpiece W is previously registered as an image pattern (model) and a portion most similar to the previously-registered model is searched from the input image. At this point, a position, an inclination, and a rotation angle of the portion most similar to the model and a correlation value indicating how much similar it is to the model are calculated. By applying labeling processing, a portion matched with the previously-registered model or display attribute (such as a color) is searched from the input image, and a label (a number) is added to the searched portion. In response to the designation of the number, an area or a center-of-gravity of the designated portion is calculated using the number.

At this point, it is assumed that the measurement processing unit 221 outputs the position and the correlation value of the workpiece W calculated by the pattern matching as the measurement result. It is also assumed that the parameter (the type and the value) of the measurement processing indicates the type and the value of a correlation coefficient used to calculate the correlation value.

Referring to FIG. 4, the following items are stored in memory 124: image data 333 of the captured image output from the imaging unit 110; a table 331 in which data related to each piece of image data 333 is stored; panoramic image data 332; and data including imaging parameter 350.

In the table 331, the data related to the image data 333 of the captured image acquired every time of the imaging includes a measurement result 334 of the measurement processing performed on the image data 333. The data in table 331 also include: a deviation amount 335; a counter value 336 inputted from the encoder counter in capturing the image data 333; a parameter (the type and the value) 337 of the measurement processing performed on the image data 333; and an imaging interval 339. The measurement result 334 includes the correlation value and an image coordinate position which are acquired when the measurement processing unit 221 performs the measurement processing on the corresponding image data 333. The parameter 337 indicates the type or the value of the correlation coefficient used to calculate the correlation value.

<Panoramic Image Generation Processing>

Figure 5:
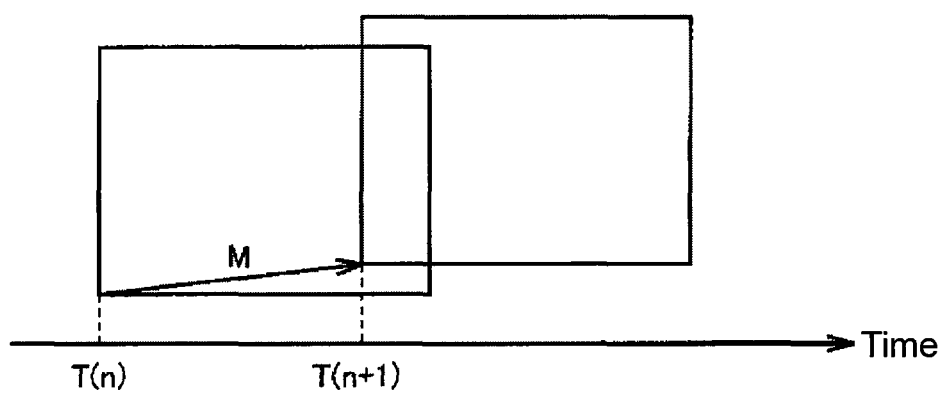
FIG. 5 is a view illustrating a procedure for generating a panoramic image according to the first embodiment of the invention.

FIG. 5 is a view illustrating a procedure to generate the panoramic image according to the first embodiment of the invention. The panoramic image generation processing performed by the image generation unit 223 will be described with reference to FIG. 5.

The panoramic image may be generated by a well-known panoramic synthesizing technology. However, at this point, the panoramic image generation processing in which the counter value 336 of the encoder counter is used will be described below.

In advance of the generation of the panoramic image, the overlapping acquisition unit 222 acquires the deviation amount 335 of each piece of image data 333, and the deviation amount 335 is stored in the table 331. Specifically, the overlapping acquisition unit 222 acquires the counter value 336 from the encoder counter 132 during the imaging, and stores the counter value 336 in the table 331 while correlating the counter value 336 with the image data 333 of the captured image. Thus, every time the captured image is acquired, the image data 333 and the counter value 336 are acquired and stored in the table 331.

A procedure to acquire the deviation amount 335, which is performed by the overlapping acquisition unit 222 will be described below. It is assumed that Epc=(Xp, Yp) is a travel distance vector expressing the travel distance on the line 1 of the conveyer per pulse of the counter value of the encoder counter 132. It is assumed that a conversion coefficient R [mm/pix] per pixel of the image data 333 of the captured image is previously determined and stored in the memory 124. In this case, the travel distance vector is defined as Epp=(Xp/R, Yp/R) on the image per pulse of the counter value 336. In the first embodiment, Epc=(Xp,0) is used for convenience.

Referring to FIG. 5, assuming that T(n) is the counter value 336 in capturing the Nth image data 333, and that T(n+1) is the counter value 336 in capturing the (N+1)-th image data 333, a deviation amount M between the Nth and (N+1)-th images can be calculated as M=(T(n+1)−T(n))× Epp.

Accordingly, the overlapping acquisition unit 222 can calculate the deviation amount M between the Nth and (N+1)-th pieces of image data 333 using the counter value 336 read from the table 331. The calculated deviation amount M is stored as the deviation amount 335 in the table 331. For the image data 333 of the table 331, the deviation amount 335 corresponding to image data D(i) corresponds to the deviation amount M between image data D(i) and image data D(i+1).

<Generation of Panoramic Image>

The panoramic image generation performed by the image generation unit 223 will be described below. The image generation unit 223 generates the panoramic image every time the CPU 122 receives a monitor instruction from the operation display device 500.

The image data 333 captured and acquired by the imaging unit 110 is stored in the table 331 in the imaging order. In generating the panoramic image, the number of pieces of image data 333 necessary to generate the panoramic image is stored in the table 331.

When receiving the monitor instruction, the image generation unit 223 sequentially reads the Nth and (N+1)-th pieces of image data 333 from the table 331. More specifically, the image generation unit 223 reads the pieces of image data 333 in the imaging order, and arrays the pieces of image data 333 in a predetermined area of the memory 124 in the order in which the pieces of image data 333 are read from the table 331. The panoramic image data 332, is generated by repeating the processing and includes the plural (specifically, at least two) pieces of image data 333, which are continuously captured.

The panoramic image data 332 includes the following: plural pieces of image data 333 used to generate the panoramic image; the measurement result 334 related to each piece of image data 333 read from the table 331; the deviation amount 335; a position 338 of the image in the panoramic image; and a ratio 340. The ratio 340 is described in detail later.

The image generation unit 223 determines the position 338 in the following manner. At this point, a size of the panoramic image is previously determined according to a size of the display 502, and a size of the image data 333 is previously determined. Accordingly, when the number of pieces of image data 333 constituting the panoramic image is determined, the position of each piece of image data 333 in the panoramic image is uniquely determined by the deviation amount 335.

Every time the image generation unit 223 generates the panoramic image data 332, the image generation unit 223 sets a pointer 360 to the table 331. The pointer 360 indicates the finally-read image data 333, namely, the latest image data 333 in the plural pieces of image data 333 used to generate the panoramic image data 332.

When the monitor instruction is inputted next, the image generation unit 223 generates the data of the new panoramic image using the image data 333 that is stored subsequent to the image data 333 indicated by the pointer 360.

<Main Flowchart>

Figure 6:
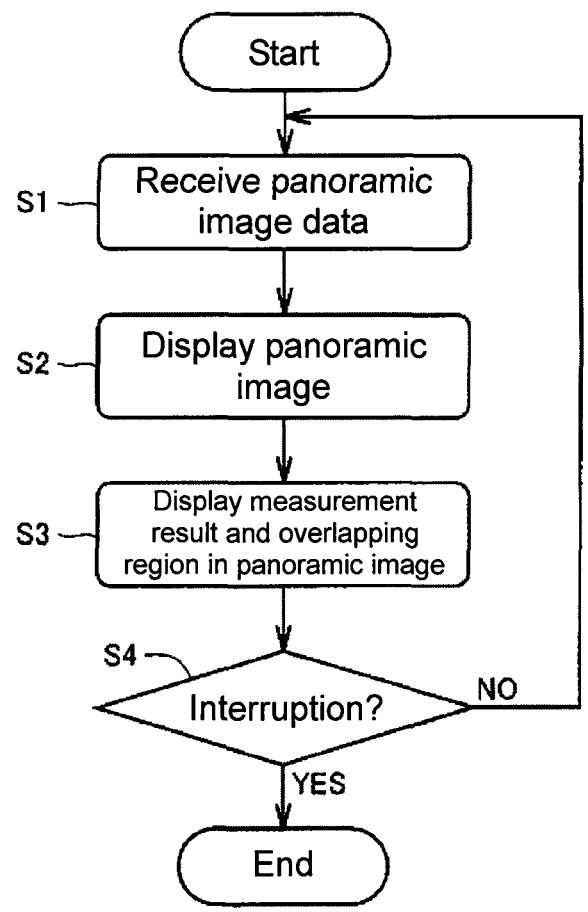
FIG. 6 is a main flowchart of the processing according to the first embodiment of the invention.
Figure 7:
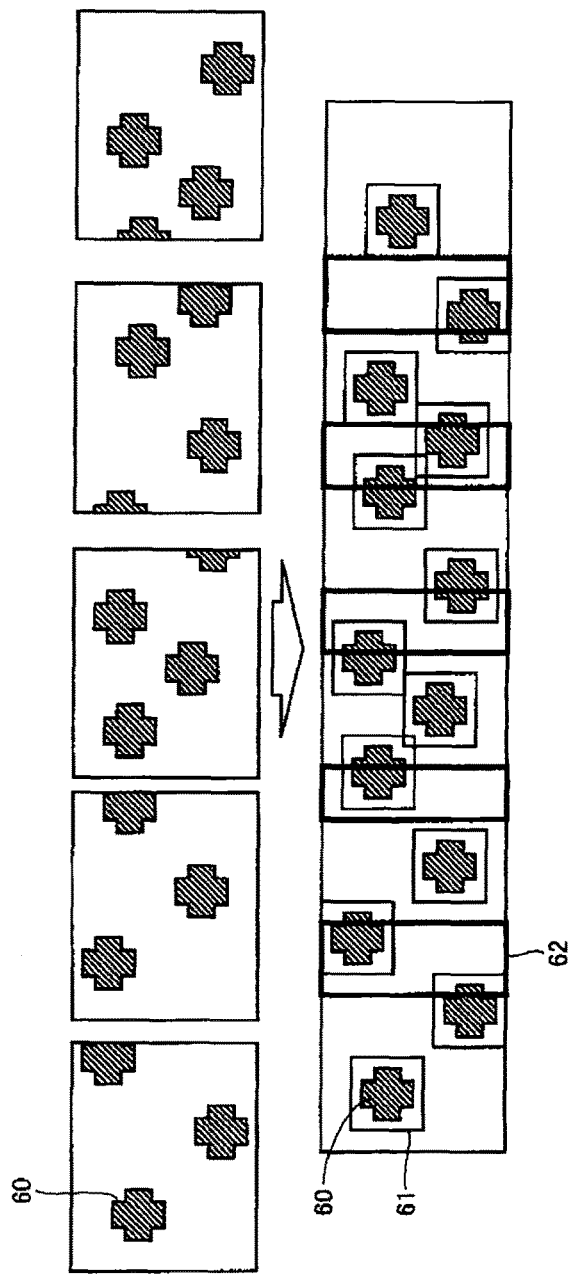
FIG. 7 is a view illustrating a panoramic image developed in the first embodiment of the invention.

FIG. 6 is the main flowchart of processing according to the first embodiment of the invention. FIG. 7 is a schematic diagram illustrating the panoramic image of the first embodiment of the invention. In FIG. 7, the lower-stage panoramic image is generated by overlapping the pieces of image data 333 of the upper-stage captured images according to the corresponding deviation amount 335 in the imaging order. Each piece of image data 333 includes an image 60 of the workpiece conveyed on the line 1. An image 61 of the measurement processing result for each piece of image data, and an image 62 of the overlapping region, are simultaneously displayed together with each piece of image data while overlaid (superimposed) on the panoramic image.

At this point, the measurement processing result is displayed by the image 61. In the case that the measurement processing result is displayed while correlated with the panoramic image, the measurement processing result is not limited to the superimposed image. The measurement processing result may also or alternatively be displayed by an individual graph or numerical value. The overlapping region is superimposed and displayed by the image 62. However, the overlapping region is not limited to the superposition mode. The overlapping region may be displayed in any manner so long as the overlapping region is correlated with the panoramic image. The panoramic image generation and display procedure in FIG. 7 will be described with reference to the flowchart in FIG. 6.

It is assumed that the plural pieces of image data 333 acquired by the imaging of the imaging unit 110 and the data related to each piece of image data 333 are stored in the table 331.

The CPU 122 reads the panoramic image data 332 generated by the image generation unit 223 from the table 331, and transmits the panoramic image data 332 to the operation display device 500. Therefore, the computation processing unit 510 of the operation display device 500 receives the panoramic image data 332 through the communication interface 528 (Step S1). The received panoramic image data 332 is stored in the memory 520.

The computation processing unit 510 displays each piece of image data 333 of the panoramic image data 332 from the memory 520 on the display 502 while overlapping the image data 333 according to the deviation amount 335 and the position 338, which are correlated with each other (Step S2). Therefore, the panoramic image is displayed on the display 502.

Then the computation processing unit 510 reads the measurement result 334 correlated with each piece of image data 333 from the memory 520, and displays the image 61 on the panoramic image of the display 502 based on the measurement result 334 (Step S3). The display position of the image 61 can be determined by the image coordinate position included in the measurement result 334. The image 62, expressing the overlapping region between the pieces of image data 333, is simultaneously displayed on the panoramic image (Step S3).

The operator performs the operation to continue or interrupt the monitor using the operation unit 503. The input interface 550 receives and outputs the instruction to continue or interrupt the monitor in response to the operation. The computation processing unit 510 determines the continuation or the interruption of the monitor based on the input instruction (Step S4).

The sequence of the pieces of processing is ended when the computation processing unit 510 determines the interruption of the monitor (YES in Step S4). The processing returns to Step S1 when the computation processing unit 510 determines the continuation of the monitor (NO in Step S4). Therefore, the computation processing unit 510 transmits the monitor instruction to the captured image processing unit 120 through the communication interface 528.

The image generation unit 223 of the captured image processing unit 120 generates the next panoramic image data 332 in response to the received monitor instruction. Then, because the pieces of processing from Step S1 are performed to the newly-generated panoramic image data 332, the operator can monitor the line 1 using the new panoramic image displayed on the display 502.

The panoramic image at the lower stage in FIG. 7 is displayed on the display 502, so that the operator can simultaneously check the image 61 of the measurement processing result and the image 62 of the overlapping region. Whether the visual sensor 100 detects the workpiece is determined by checking the images 60 and 61.

Because the operator can check the imaging interval by checking the image 62 of the overlapping region, it can be determined which one of the measurement processing and the imaging interval causes the workpiece to not be able to be detected.

<Other Display Modes>

The panoramic image of the first embodiment is not limited to the display mode in FIG. 7, but the following display modes may be used.

Figure 8:
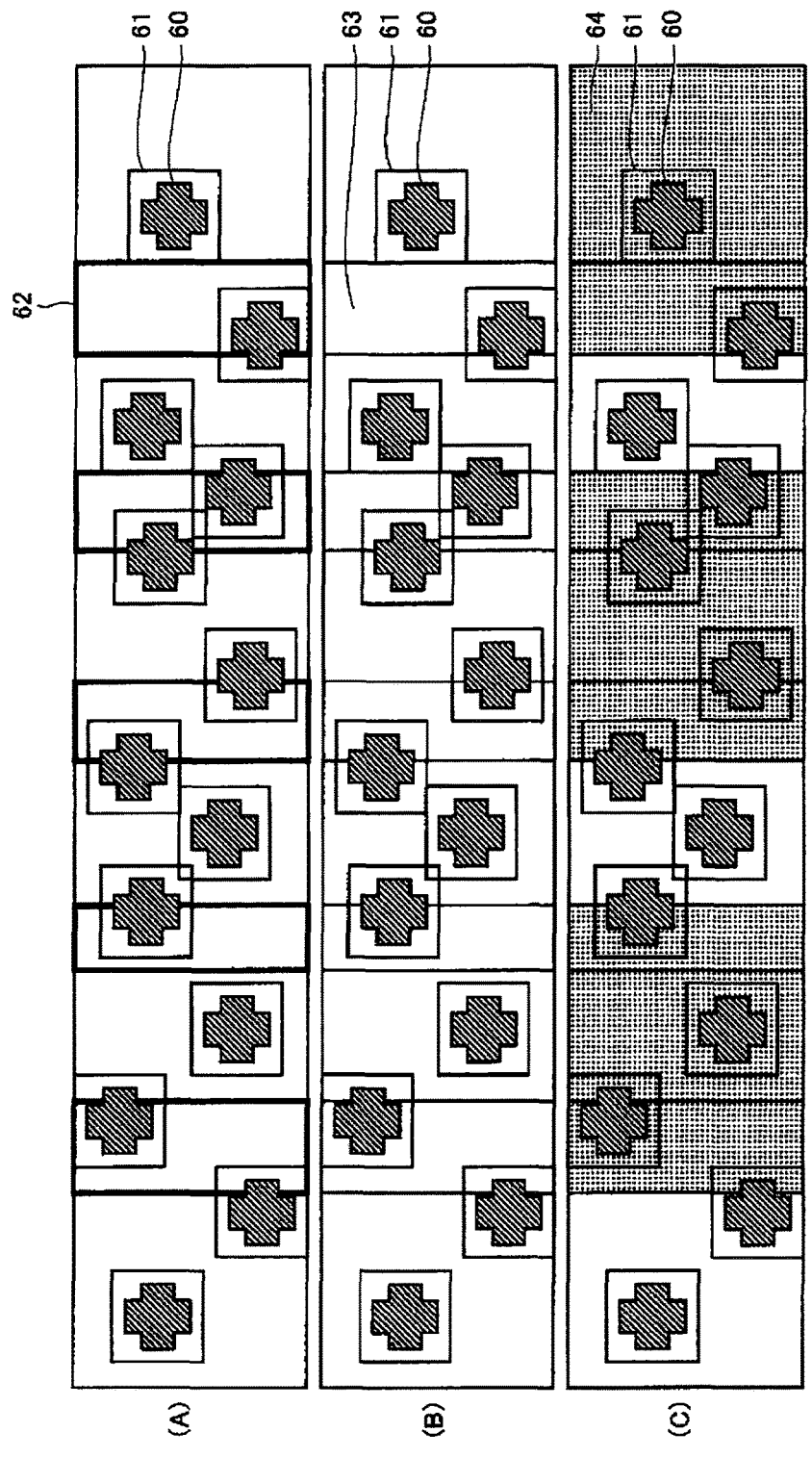
FIGS. 8(A), 8(B), and 8(C) are views illustrating other examples of a panoramic image display mode according to the first embodiment of the invention.

FIGS. 8(A) to 8(C) are views illustrating other examples of a panoramic image display mode according to the first embodiment of the invention. In the display mode of the panoramic image, as illustrated in FIG. 8(A), the image 61 may be displayed while correlated with the image 60 of the workpiece based on the measurement processing result, and the image 62 of the overlapping region may be surrounded by a thick-line frame. The image 61 may be displayed while color-coded according to the value (the correlation value) of the measurement processing result.

As illustrated in FIG. 8(B), the image 62 of the overlapping region may be displayed by a predetermined color 63. As illustrated in FIG. 8(C), for the sequence of images that are overlapped with the deviation amount M in the panoramic image, the Nth image and the (N+1)-th image, namely, the odd-numbered image and the even-numbered image, may differ from each other in the display mode. For example, the odd-numbered image and the even-numbered image may be displayed while background colors 64 vary.

<Scroll Display>

Figure 9:
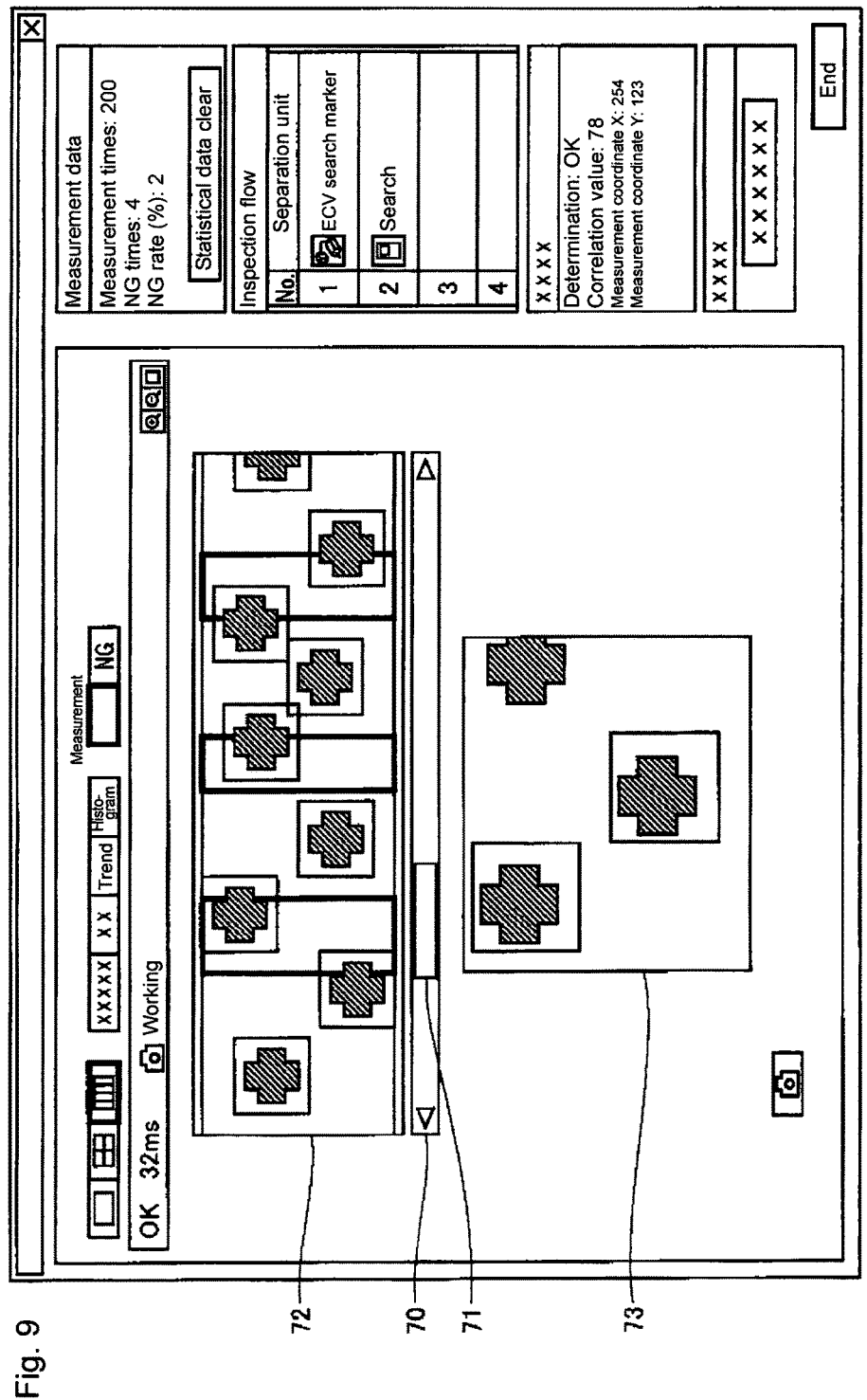
FIG. 9 is a view illustrating a scroll of the panoramic image according to the first embodiment of the invention.

FIG. 9 is a view illustrating a scroll of the panoramic image according to the first embodiment of the invention. Referring to FIG. 9, the display region of the display 502 includes a display region 72 for the panoramic image, a display region for a slide bar 70, and a display region for a selected image 73.

The panoramic image in which the plural images are horizontally arrayed in line is displayed in the region 72. An extending direction of the slide bar 70 is identical to the direction in which the image array extends. The operator operates the slider 71 on the slide bar 70. The computation processing unit 510 detects the travel distance (a moving direction and a moving distance) of the slider 71 through the input interface 550, and outputs a scroll instruction related to the detected travel distance to the display controller 540. According to the travel distance related to the scroll instruction, the display controller 540 moves the image (the panoramic image) of the region 72, namely, it displays the image of the region 72 while scrolling the image.

At this point, it is assumed that the panoramic image data 332, including the sufficient number of pieces of image data 333, is stored in the memory 529 such that the scroll can be performed.

By performing the scroll operation through the operation unit 503, the operator can select the desired image from the plural images in the panoramic image displayed on the region 72. When the selection operation is performed, the computation processing unit 510 detects a click position of a click operation through the input interface 550. The image data 333 corresponding to the selected image is enlarged and displayed as the selected image 73 based on the detected click position and the position 338 of the panoramic image data 332.

Second Embodiment

A second embodiment will be described below. A preferred example in which the operator changes various parameters in the image processing will be described in the second embodiment.

Figure 10:
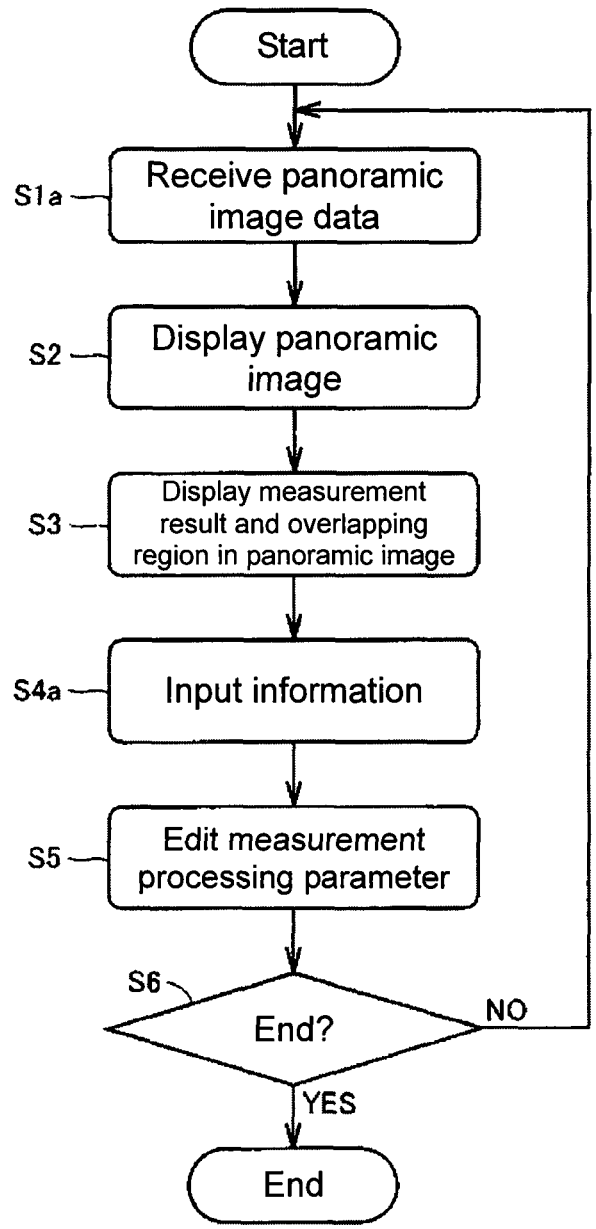
FIG. 10 is a main flowchart of the processing according to a second embodiment of the invention.

FIG. 10 is the main flowchart of processing according to the second embodiment of the invention. The parameter related to the measurement processing is changed in the processing of FIG. 10.

The CPU 122 reads the panoramic image data 332 generated by the image generation unit 223 from the table 331, and transmits the panoramic image data 332 to the operation display device 500. Therefore, the computation processing unit 510 of the operation display device 500 receives the panoramic image data 332 through the communication interface 528 (Step S1a). The received panoramic image data 332 is stored in the memory 520.

In Steps S2 and S3, similar to the first embodiment, the panoramic image is displayed on the display 502, and the image 61 of the measurement processing result and the image 62 of the overlapping region are simultaneously displayed while overlaid on the panoramic image.

In the case where the parameter of the measurement processing is changed, the operator operates the operation unit 503 to input the information for changing the parameter (Step S4a). Specifically, the operator inputs the information on the type of the parameter and the information indicating the post-change value.

The computation processing unit 510 transmits the information for changing the parameter to the captured image processing unit 120 through the communication interface 528.

The captured image processing unit 120 receives the information for changing the parameter. Using the received information, the measurement parameter update unit 227 updates the parameter (such as the type and the value) for the measurement processing, and outputs the post-update parameter to the measurement processing unit 221.

Using the post-change parameter, the measurement processing unit 221 performs the measurement processing to each piece of image data 333 in the currently-displayed panoramic image. The measurement result 334 related to the each piece of image data 333 in each piece of panoramic image data 332 of the memory 124 is updated using the measurement result (Step S5). Therefore, the panoramic image data 332 of the memory 124 is edited (updated) into data having the measurement result 334, which is obtained by the measurement processing using the post-update parameter.

In the case where the post-edit panoramic image is checked, the operator makes a request for an operation to check an edit result through the operation unit 503. When the checking operation is performed, the computation processing unit 510 inputs a checking instruction in response to the operation.

When it is determined that the checking instruction is not inputted (YES in Step S6), the computation processing unit 510 ends the sequence of the pieces of processing. On the other hand, when it is determined that the checking instruction is inputted (NO in Step S6), the computation processing unit 510 transmits the checking instruction to the captured image processing unit 120.

In the captured image processing unit 120, when receiving the checking instruction, the CPU 122 reads the post-edit panoramic image data 332 from the memory 124 and transmits the post-edit panoramic image data 332 to the operation display device 500. Therefore, the pieces of processing from Step S1 are performed using the post-edit panoramic image data 332. Accordingly, using the panoramic image, the operator can check the measurement processing result, which is obtained by using the post-update parameter.

In the second embodiment, the panoramic image in which the parameter is already updated is acquired by editing the panoramic image data 332 that is already generated and stored in the memory 124. However, the panoramic image acquiring method is not limited to the method of the second embodiment. For example, the newly-captured and -acquired image data 333 may be used.

Specifically, as described above in the first embodiment, the new panoramic image data 332 may be generated by performing the measurement processing using the post-update parameters for the pieces of image data 333 from the image data 333 indicated by the pointer 360.

The parameter 337 of the table 331 may be updated using the post-update parameter. Particularly, on an as needed basis, the parameter 337 of the table 331 may be updated when the operator inputs the update instruction through the operation unit 503.

<Display Mode>

Figure 11:
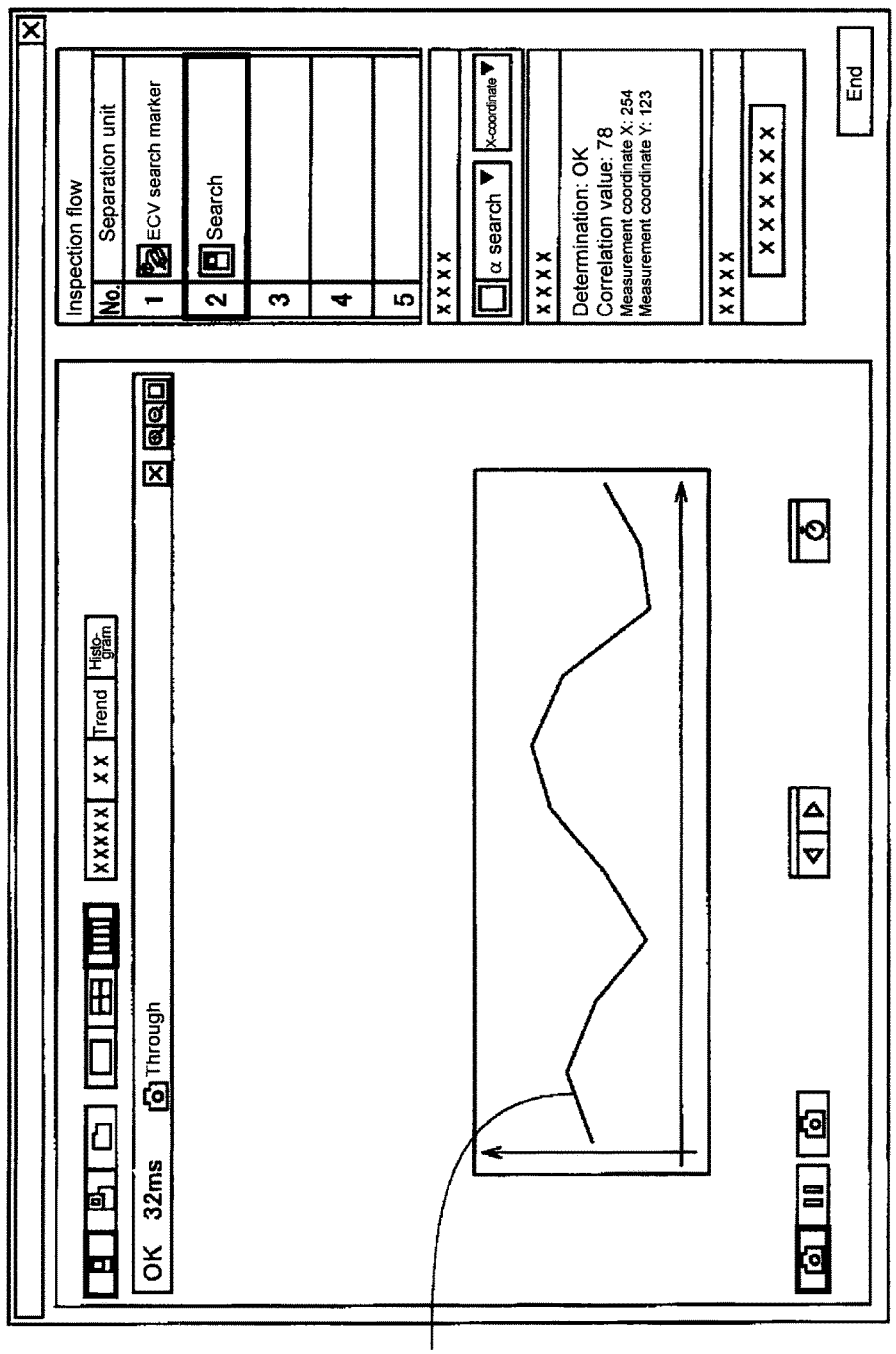
FIG. 11 is a view illustrating a panoramic image display mode according to the second embodiment of the invention.
Figure 12:
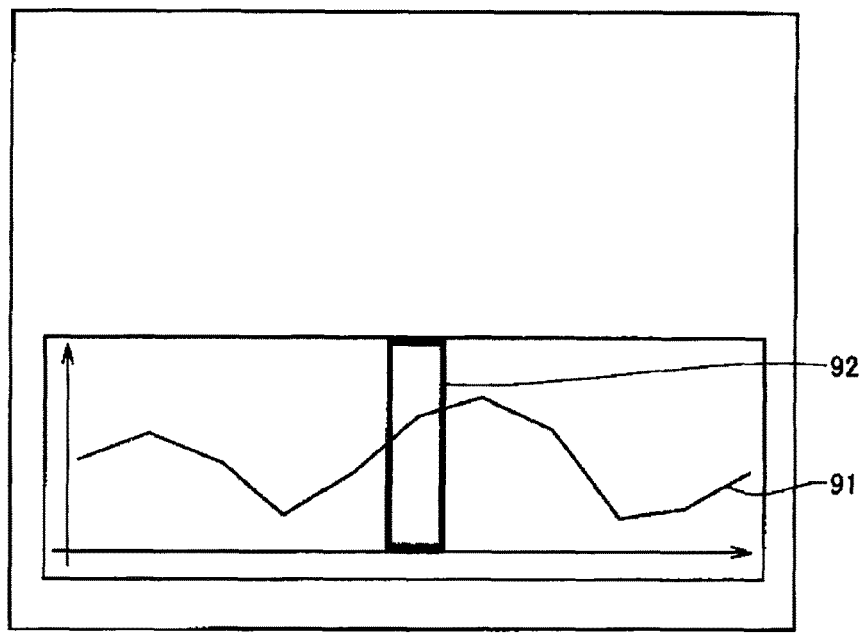
FIG. 12 is a view illustrating the panoramic image display mode according to the second embodiment of the invention.
Figure 13:
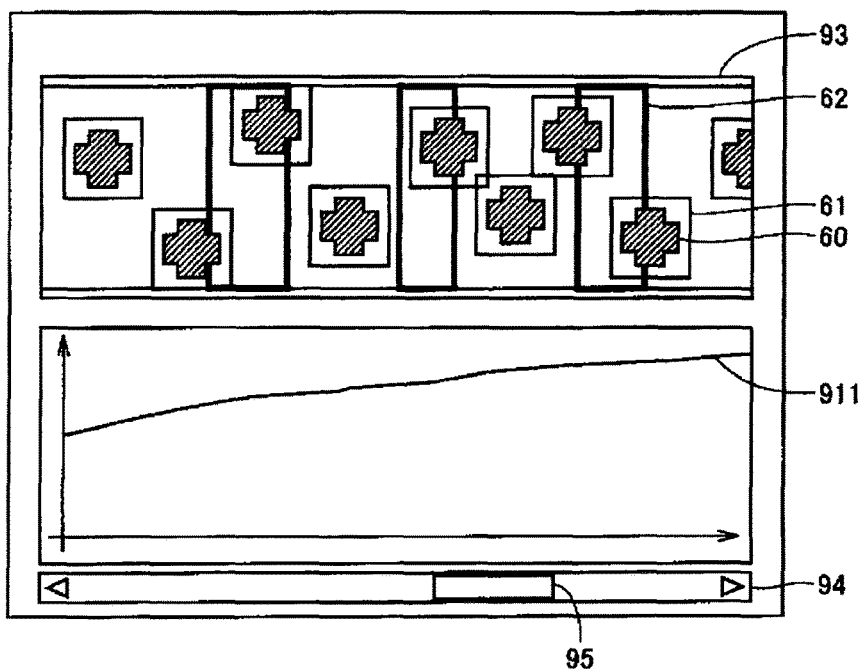
FIG. 13 is a view illustrating the panoramic image display mode according to the second embodiment of the invention.

FIGS. 11 to 13 are views illustrating the panoramic image display mode according to the second embodiment of the invention. As described above, in the case where the parameter of the measurement processing is updated, the value of the measurement result 334 is extracted and displayed such that the operator easily understands an indication of the post-update value.

Referring to FIG. 11, a vertical axis indicating the value of the measurement result 334 and a horizontal axis orthogonal to the vertical axis are displayed on the display 502. The horizontal axis indicates the value expressing the position of each piece of image data 333 in the panoramic image. The position is acquired based on the position 338. At this point, for example, the value indicated by the vertical axis expresses the correlation value.

A graph 91 is generated by connecting the correlation values corresponding to the pieces of image data 333 using line divisions. The operator can quickly understand whether the image data 333, in which the value of measurement result 334 is high or low, exists from the graph 91.

FIG. 12 illustrates a state in which a portion 92 of the graph 91 is selectively designated in response to the operator's operation. The portion 92 is displayed in the mode in which the portion 92 can be distinguished from the graph 91. For example, the frame of the portion 92 is displayed in red.

The computation processing unit 510 extracts the horizontal-axis value corresponding to the portion 92 through the input interface 550. The image data 333, the data of the measurement result 334, and the data of the deviation amount 335, which are correlated with the position 338 corresponding to the extracted value, are read from the memory 520, and the image is displayed on the display 502 based on the read pieces of data (see FIG. 13).

FIG. 13 illustrates the state in which the image corresponding to the portion 92 (FIG. 12) is enlarged and displayed. In the display 502 in FIG. 13, a panoramic image 93 is displayed on the upper top portion of FIG. 13, and a graph 911 is displayed on the lower portion in relation to the panoramic image 93. The upper-panoramic image 93 includes the image data 333 (FIG. 4) corresponding to the portion 92 of the selected measurement result and the pieces of image data 333 that are acquired before and after the image data 333 concerned.

A slide bar 94 is displayed in the direction identical to the direction in which the horizontal axis of the graph 911 extends. The operator can operate a slider 95 on a slide bar 94.

The computation processing unit 510 moves and displays the portion 92 based on the travel distance (the moving direction and the moving distance) of the slider 95 by the slide operation. The image data 333, the data of the measurement result 334, and the data of the deviation amount 335, which are correlated with the post-movement position 338 of the portion 92, are read from the panoramic image data 332 of the memory 520, and the image is enlarged and displayed on the display 502 based on the read pieces of data. Therefore, the panoramic image and the graph 911 in FIG. 13 can be scroll-displayed in conjunction with the slide operation.

Although the horizontal axis of the graph 91 indicates the value of the position 338, the horizontal axis may indicate the counter value 336 instead of the position 338.

<Other Examples of the Display Mode>

The graph 911 and the panoramic image 93 may have display modes as illustrated in FIGS. 14 to 17.

Figure 14:
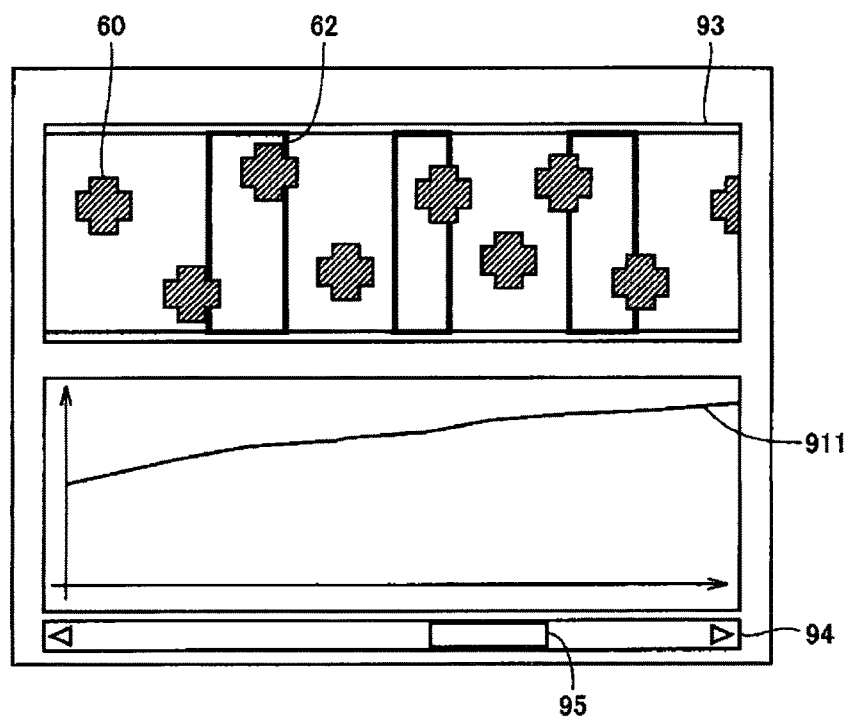
FIG. 14 is a view illustrating the panoramic image display mode according to the second embodiment of the invention.
Figure 15:
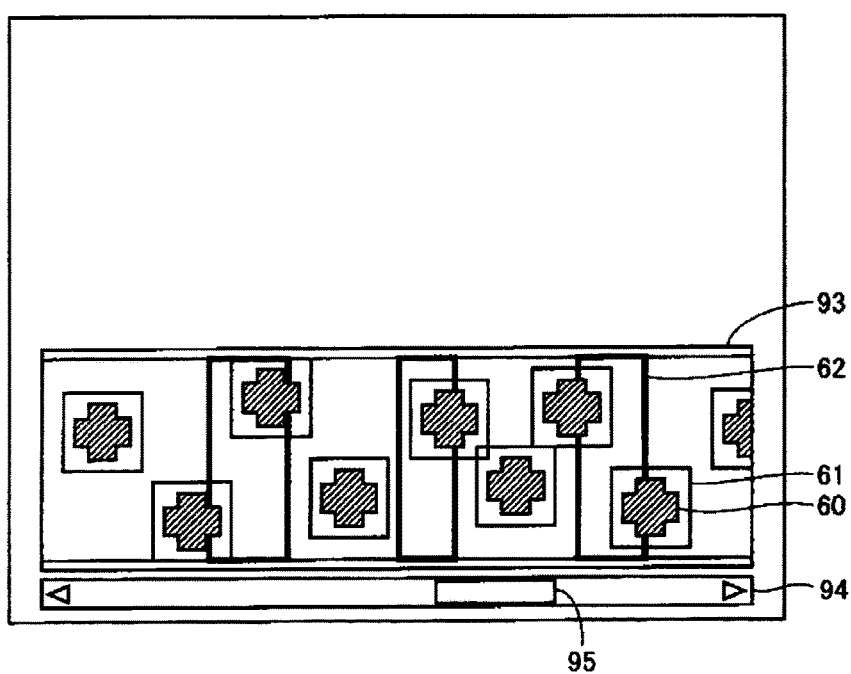
FIG. 15 is a view illustrating the panoramic image display mode according to the second embodiment of the invention.

In FIG. 14, the display of the image 61 of the measurement result is not given in the panoramic image 93 of FIG. 13. In FIG. 15, only the panoramic image 93 is displayed.

Figure 16:
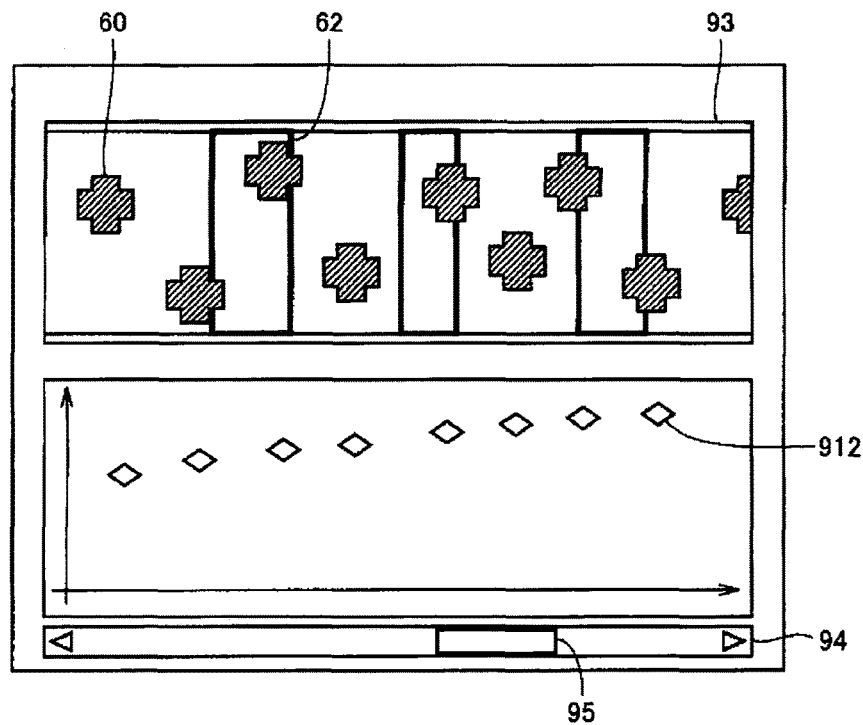
FIG. 16 is a view illustrating the panoramic image display mode according to the second embodiment of the invention.
Figure 17:
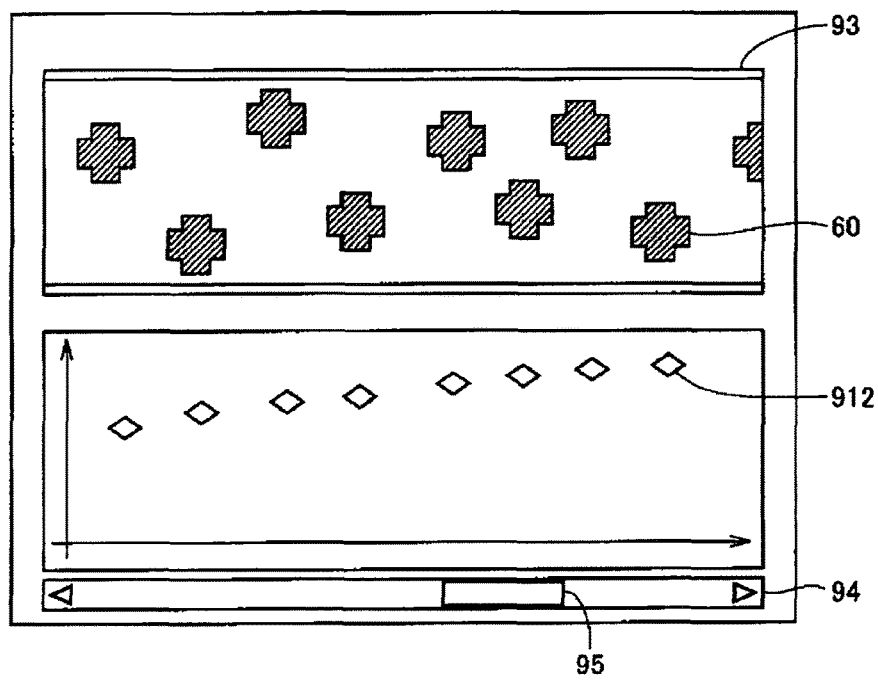
FIG. 17 is a view illustrating the panoramic image display mode according to the second embodiment of the invention.

In FIG. 16, instead of the graph 91 in FIG. 11, only the correlation value of the measurement result of each workpiece W is displayed by a point 912 plotted in relation to the image 60 of the upper-stage workpiece W. In FIG. 17, only the image 60 of the workpiece is displayed while the image 62 is eliminated from the panoramic image 93 in FIG. 16. The plotted points 912 may be connected to each other in FIG. 16 or 17.

The operator can switch the image displayed on the display 502 to one of the image in FIG. 13 and the images in FIGS. 14 to 17 by operating the operation unit 503.

<Display Example in which a Threshold is Used>

Figure 18:
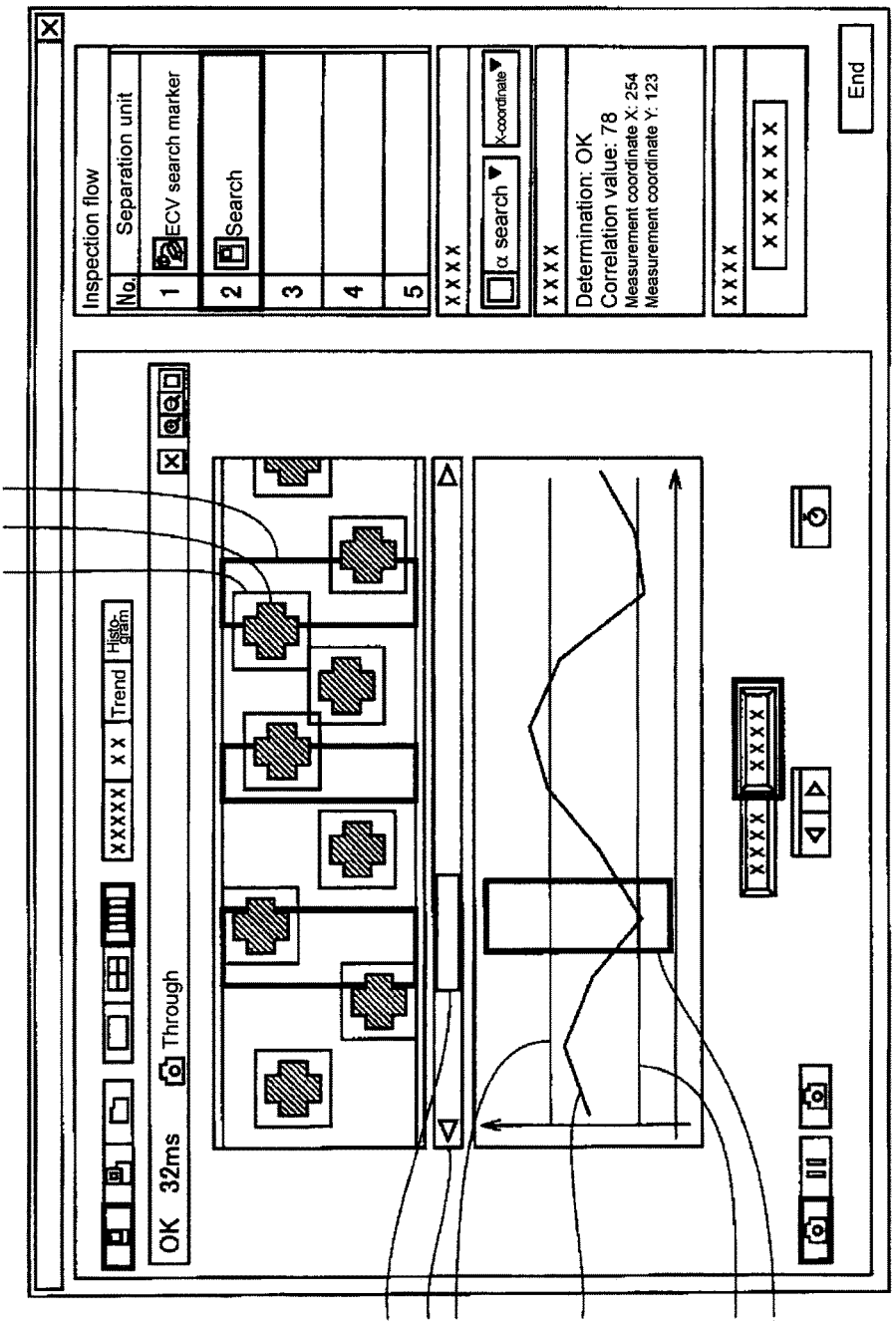
FIG. 18 is a view illustrating a screen on which a measurement result is displayed using a threshold according to the second embodiment of the invention
Figure 19:
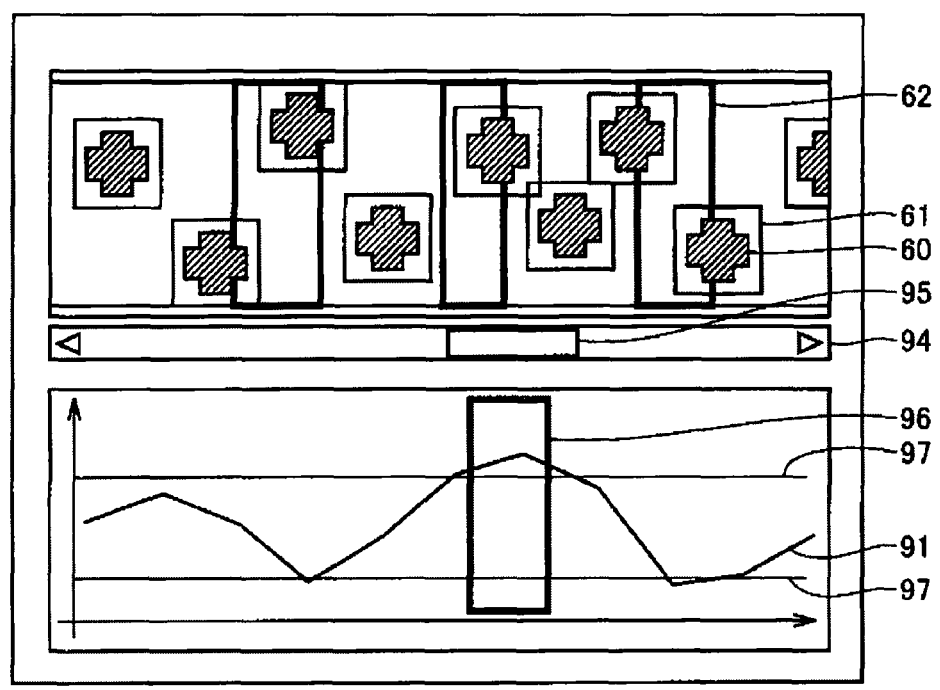
FIG. 19 is a view illustrating the screen on which the measurement result is displayed using the threshold according to the second embodiment of the invention

FIGS. 18 and 19 illustrate screens on which the measurement result is displayed using a threshold.

In the case where a threshold 97 is set to the measurement result 334, the computation processing unit 510 compares the value (specifically, the correlation value) of each measurement result 334 of the graph 91 to a threshold 97. Based on a comparison result, in the graph 91, the computation processing unit 510 displays an image 96 expressing a portion in the range of the threshold 97 while superimposing the image 96 on the graph 91 (see FIG. 18). For example, the image 96 is displayed by the frame, and the frame is displayed in a mode different from that of the graph 91. For example, the frame differs from the graph 91 in color.

When the operator operates the operation unit 503 while the image 96 is displayed, the computation processing unit 510 displays the image 96 while sequentially moving the image 96 to another portion (in the graph 91, the portion in the range of the threshold 97) of the graph 91.

The image 96 in FIG. 18 indicates the portion in the range of the threshold 97. Alternatively, as illustrated in FIG. 19, the image 96 may indicate a portion out of the range of the threshold 97.

<Display Example in which the Overlapping Measurement is Eliminated>

In order that the robot 300 accurately holds the workpiece W, it is necessary to eliminate the situation (hereinafter referred to as overlapping measurement) in which the measurement processing is performed at least twice to the identical workpiece W on the line 1. The information assisting the overlapping measurement is displayed in the second embodiment.

Figure 20:
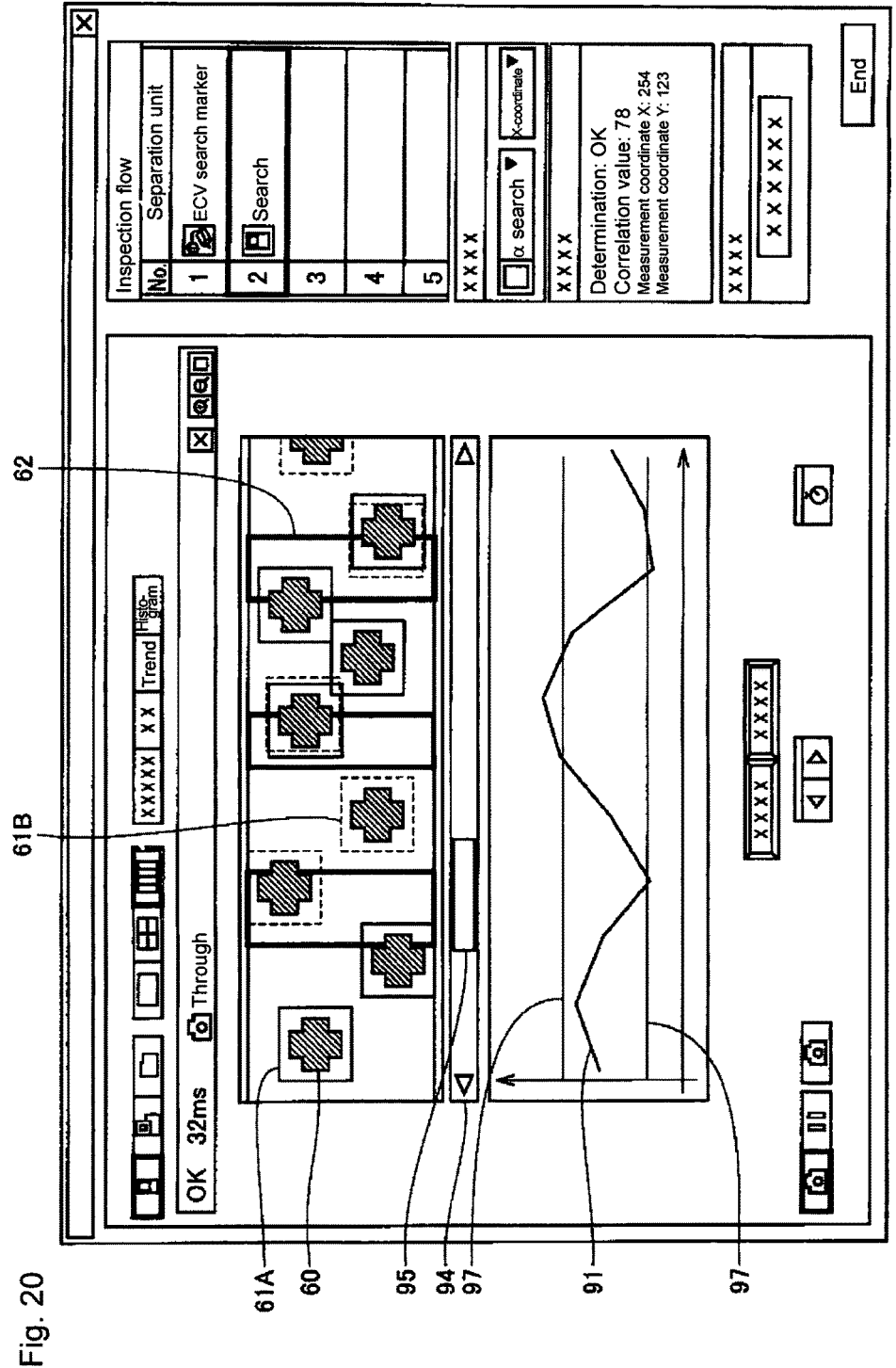
FIG. 20 is a view illustrating an example of the panoramic image for removing an overlapping measurement according to the second embodiment of the invention.

FIG. 20 is a view illustrating an example of the panoramic image for removing the overlapping measurement according to the second embodiment of the invention. In order that the operator easily checks whether measurement processing is redundantly performed to each workpiece W from the displayed panoramic image, the computation processing unit 510 displays the image 61 based on the measurement result 334 while the even-numbered image and the odd-numbered image in the panoramic image differ from each other in the display mode. For example, in FIG. 20, an image 61A based on the measurement result in the even-numbered image and an image 61B based on the measurement result in the odd-numbered image are displayed in different colors.

<Display Example of a Margin of Measurement Processing Time>

Figure 21:
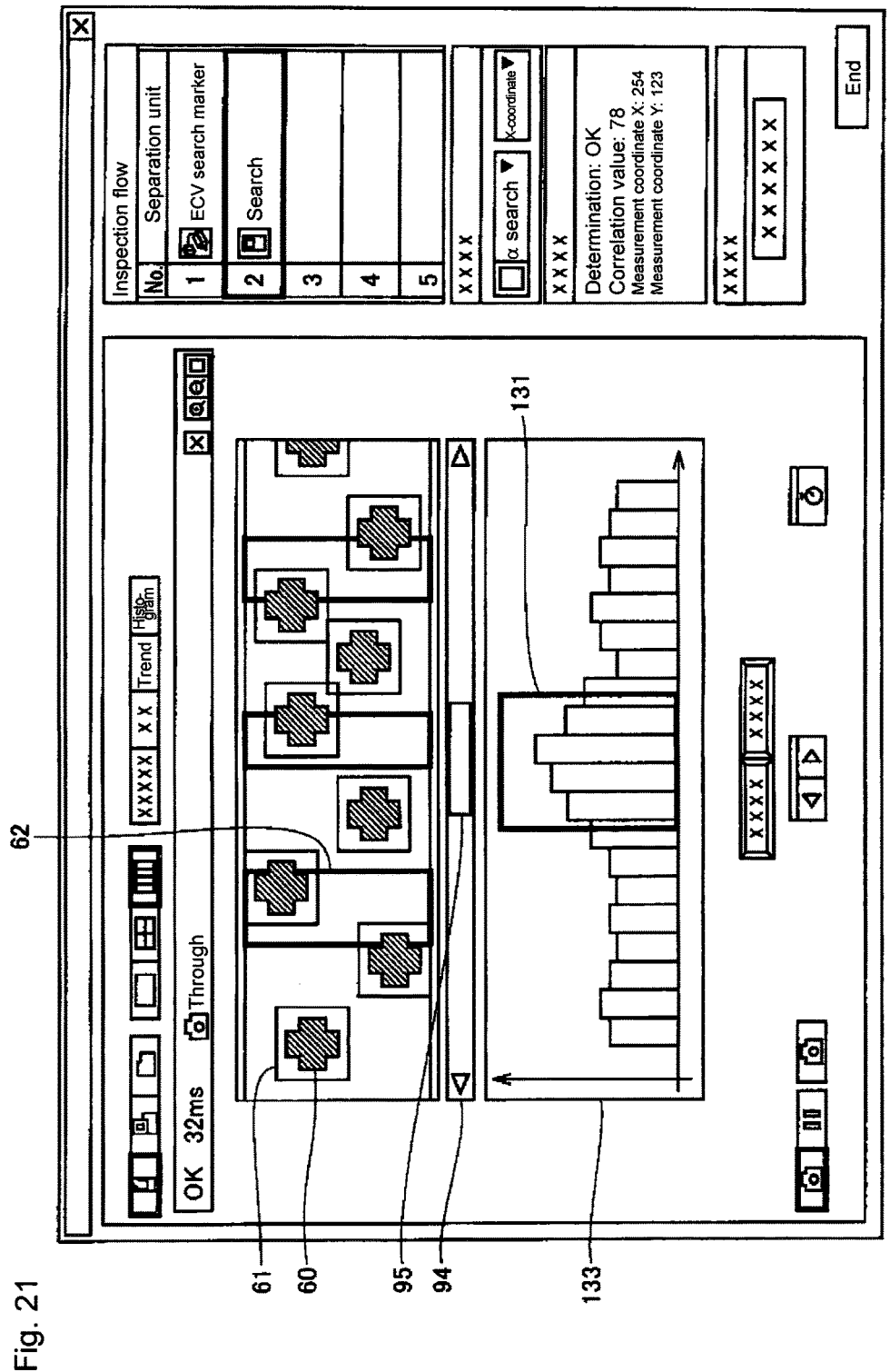
FIG. 21 is a view illustrating a screen example of a ratio of a measurement processing time to an imaging interval according to the second embodiment of the invention.

FIG. 21 is a view illustrating a screen example that uses the ratio of a measurement processing time to the imaging interval according to the second embodiment of the invention. In the second embodiment, a degree of margin of the measurement processing time is indicated by the ratio of the measurement processing time to the imaging interval. In order to acquire the ratio, the imaging interval and the measurement processing time are acquired as follows.

The CPU 122 calculates the imaging interval from ((It×a)/v). In this case, "It" [pulse] is an interval at which the imaging instruction is inputted, "a" [mm/pulse] is the conveyer travel distance per pulse, and 'v' [mm/sec] is the conveyer speed. It is assumed that these values are previously stored as the imaging parameter 350 in the memory 124.

The calculated imaging interval is stored as the data of the imaging interval 339 in the table 331 while being correlated with the image data 333 acquired by the imaging action.

The measurement processing time means a time from when the measurement processing unit 221 starts the measurement processing of the image data 333 acquired by the one-time imaging action to when the measurement processing unit 221 ends the measurement processing. For example, the time between the beginning and end of the measurement processing means the time from when the measurement processing unit 221 inputs the image data from the imaging unit 110 to when the measurement processing unit 221 outputs the measurement processing result. The time can be acquired such that the CPU 122 performs the measurement with a timer (not illustrated). At this point, a measurement processing time T [sec] is used for convenience.

The ratio acquisition unit 225 acquires the data of the ratio 340. That is, using the imaging interval 339 correlated with the image data 333 and the measurement processing time T, the ratio of the measurement processing time to the imaging interval is calculated from (measurement processing time (T)/imaging interval) with respect to each piece of image data 333 of the panoramic image data 332 of the memory 520. The ratio calculated with respect to each piece of image data 333 is registered as the ratio 340 while correlated with each piece of image data 333 of the panoramic image data 332.

In the operation display device 500, the computation processing unit 510 displays the information based on the ratio 340. Specifically, the image of a graph 133 (see FIG. 21) is generated using the data of the ratio 340, which is received from the captured image processing unit 120 and is correlated with each piece of image data 333 of the panoramic image data 332 stored in the memory 520, and the generated graph 133 is displayed on the display 502 through the display controller 540.

Referring to FIG. 21, in the graph 133, the vertical axis indicates the value of the ratio 340, and the horizontal axis orthogonal to the vertical axis indicates the value of the position 338 of each piece of image data 333 of the panoramic image. In the graph 133, the value of the ratio 340 correlated with each piece of image data 333 is displayed by the bar graph. However, the display mode of the value of the ratio is not limited to the bar graph.

According to the calculation formula, the measurement processing of the corresponding image data 333 is not ended within the imaging interval when the value of the ratio 340 is greater than "1", and the measurement processing time has the margin when the value of the ratio 340 is less than "1". Accordingly, from the graph 133, the operator can quickly understand whether the image data 333, on which the measurement processing has not ended within the imaging interval, exists in the panoramic image.

The operator can obtain assist information from graph 133 for determining whether the value of the variable "It" [pulse] or the conveyer speed is proper. Specifically, the operator can obtain information for assisting in the determination of whether the setting is changed such that the value of the variable "It" [pulse] is decreased or such that the conveyer speed is enhanced.

In the graph 133, the display mode is changed with respect to the portion in which the value of the ratio 340 is greater than "1". For example, the portion is highlighted by surrounding the portion using the frame 131. The color of the bar graph corresponding to each piece of image data 333 may be changed according to the degree of the margin of the measurement processing time.

Referring to FIG. 21, when the operator operates the slider 95, the computation processing unit 510 controls the display controller 540 such that the travel distance (the moving direction and the moving distance) of the slider 95 is inputted, such that the panoramic image is scrolled in conjunction with the inputted travel distance, and such that the graph 133 is scrolled at the same time.

According to the screen in FIG. 21, the degree of margin of the measurement processing time can be presented. Accordingly, in the case where the operator determines whether the measurement processing time in which the post-change parameter is used has the margin after the measurement processing parameter is changed in Step S5 of FIG. 10, the information assisting the determination can be presented. Not only the ratio of the measurement processing time to the imaging interval, but also the measurement processing time itself, may be displayed in order to present the degree of margin of the measurement processing time.

Figure 22:
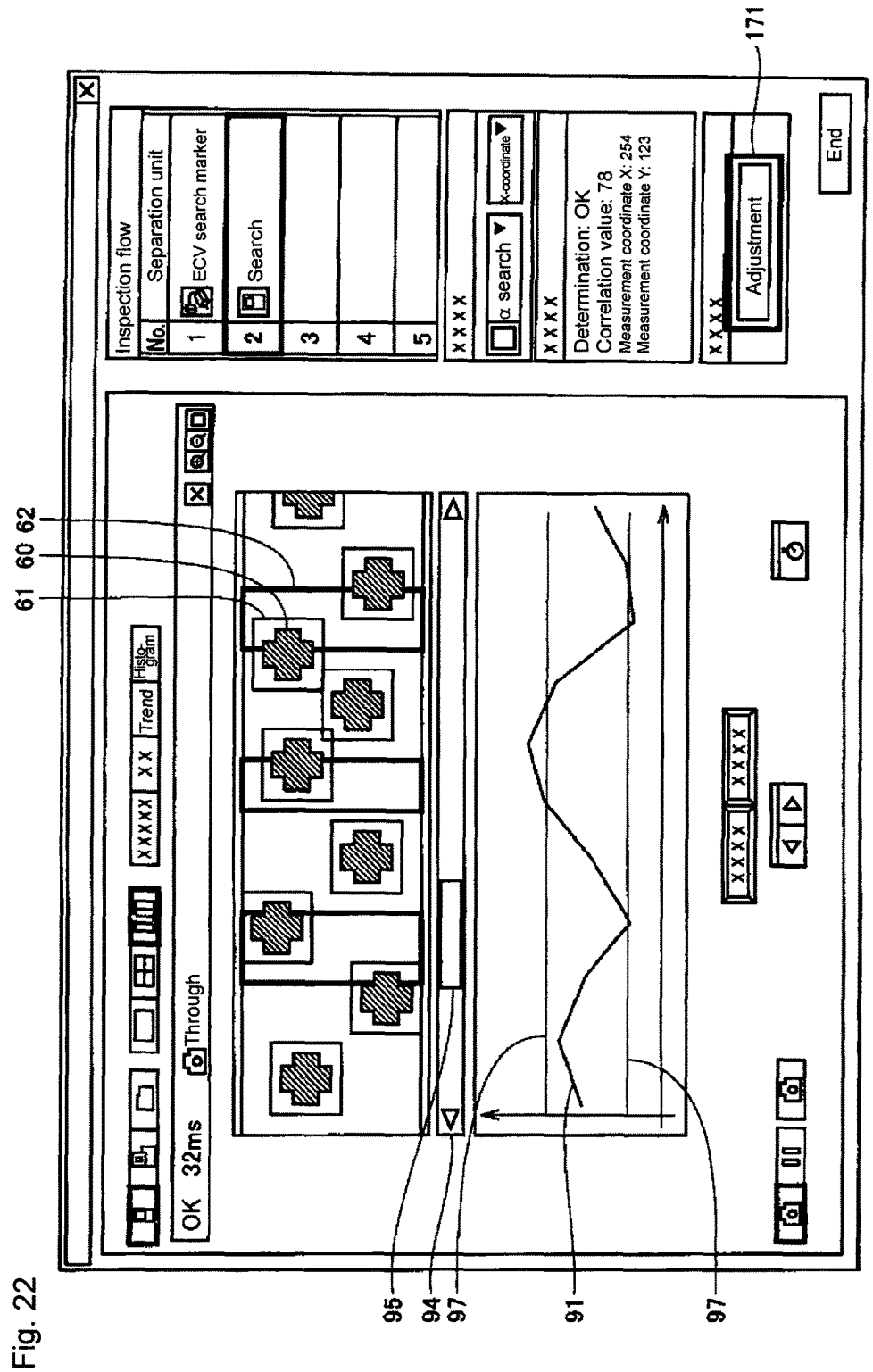
FIG. 22 is a view illustrating a screen example for changing a parameter according to the second embodiment of the invention.

FIG. 22 illustrates a screen example in which the parameter is changed in Step S5. In FIG. 22, the operator can input an instruction to change the measurement processing parameter by operating a button 171 on the screen. When the instruction to change the measurement processing parameter is inputted, the computation processing unit 510 switches the screen of the display 502 to another screen (not illustrated) used to adjust the parameter. For example, the type of the parameter and the range of the value are displayed on the screen used to adjust the parameter.

<Change of the Imaging Parameter>

Figure 23:
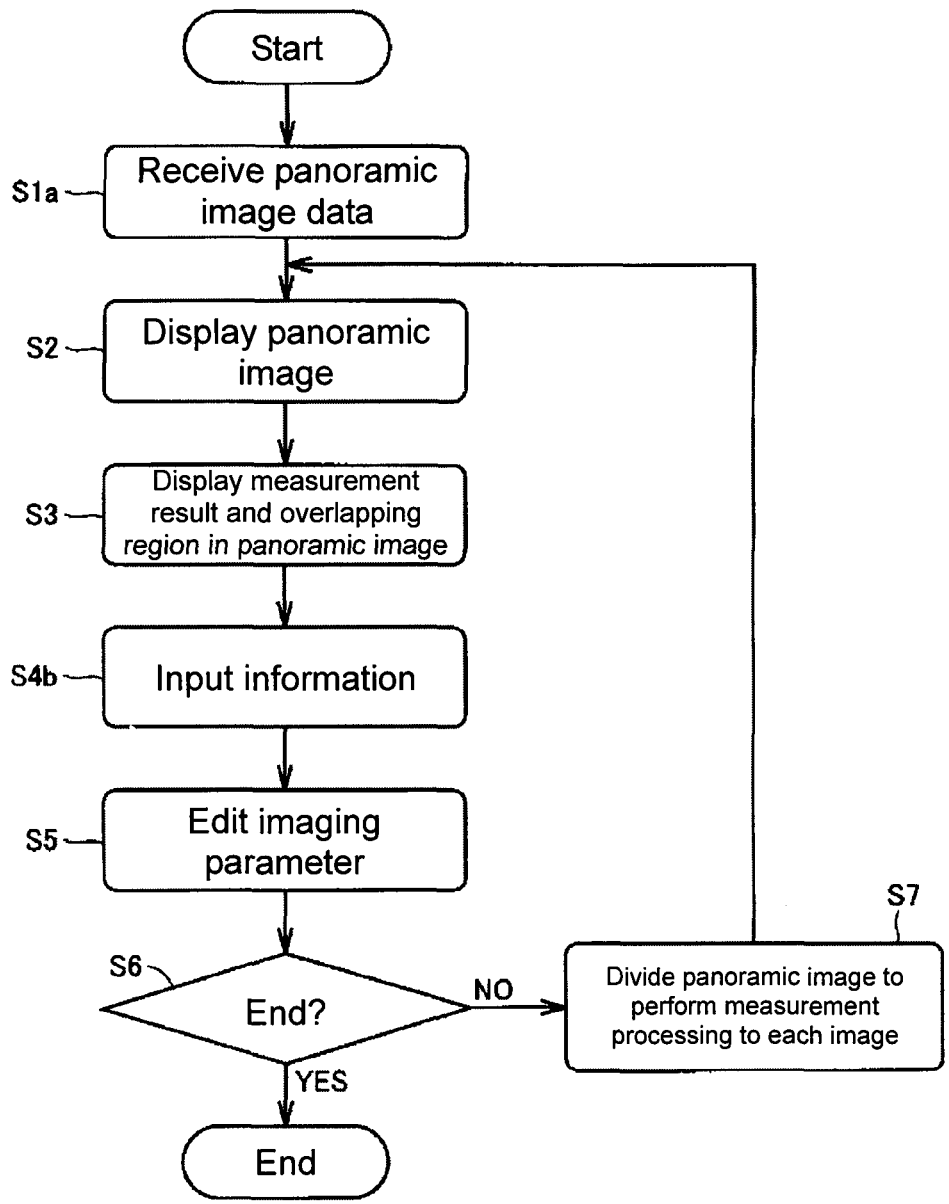
FIG. 23 is a flowchart of the process for changing an imaging parameter according to the second embodiment of the invention.

FIG. 23 is a flowchart showing the process of changing the imaging parameter according to the second embodiment of the invention. The measurement processing parameter is changed in FIG. 10, and similarly, the parameter related to the imaging action can be changed.

Referring to FIG. 23, the processing sequence in Steps S1*a* to S3 are performed similarly to FIG. 10. Therefore, the panoramic image or the graph of the measurement result is displayed on the display 502.

After the display, the operator can input the information for changing the parameter related to the imaging action by operating the operation unit 503 (Step S4*b*). Specifically, the type of the parameter and the post-change value are inputted.

The computation processing unit 510 transmits the information for changing the parameter to the captured image processing unit 120 through the communication interface 528.

In the captured image processing unit 120, the imaging parameter update unit 228 updates the imaging parameter 350 of the memory 124 using the received information. For example, the parameter determining the deviation amount M in FIG. 5 can be updated.

The processing is ended when the instruction to check the measurement result using the post-change parameter is not inputted through the operation unit 503 (YES in Step S6). When the instruction to check the measurement result is inputted (NO in Step S6), the processing is performed using the post-change parameter (Step S7).

In Step S7, the measurement processing is performed using the post-change parameter. For example, the data of the panoramic image is acquired by simulating the imaging action of the imaging unit 110 at the times of T(n) and T(n+1) after the parameter is updated.

Specifically, the image division unit 229 inputs the post-change counter values T(n) and T(n+1) from the imaging parameter update unit 228, and calculates the deviation amount M according to the procedure in FIG. 5 using the values T(n) and T(n+1). The calculated deviation amount is referred to as a post-change deviation amount MM.

Using the post-change deviation amount MM, the image division unit 229 sequentially extracts the panoramic image of the panoramic image data 332 of the memory 124 from a head image data 333 to a final image data 333. Therefore, the panoramic image data 332 can be divided into the plural pieces of image data 333 constituting the panoramic image. Each piece of image data 333 acquired by the division indicates the image data that is acquired when the imaging unit 110 is considered to perform the imaging action at the times of the post-change values T(n) and T(n+1). The acquisition of the image data 333 corresponds to the simulation of the imaging action of the imaging unit 110 at the times of the post-change values T(n) and T(n+1).

Then, the measurement processing unit 221 performs the measurement processing to each piece of image data 333 acquired by the image division unit 229, and outputs the measurement result 334. The panoramic image data 332 is generated using the output measurement result 334 and the post-change deviation amount MM. Therefore, the post-update panoramic image data is acquired to end the processing in Step S7.

Then the processing goes to Step S2. In Step S2, the post-update panoramic image data is transmitted to the operation display device 500 from the captured image processing unit 120. The computation processing unit 510 of the operation display device 500 displays the post-update panoramic image on the display 502 using the received post-update panoramic image data, and simultaneously displays the image of the overlapping region and the image of the measurement result (Step S3).

The operator can check the measurement result while correlating the measurement result with the post-update panoramic image displayed on the display 502. Therefore, the assist information can be obtained to determine whether the value of the post-update imaging parameter is proper.

Third Embodiment

The display of the panoramic image according to a robot coordinate system in which the calibration is performed will be described in the third embodiment.

<Calibration>

The calibration that converts an image coordinate system of the visual sensor 100 into the robot coordinate system of the robot 300 will be described below.

Figure 24:
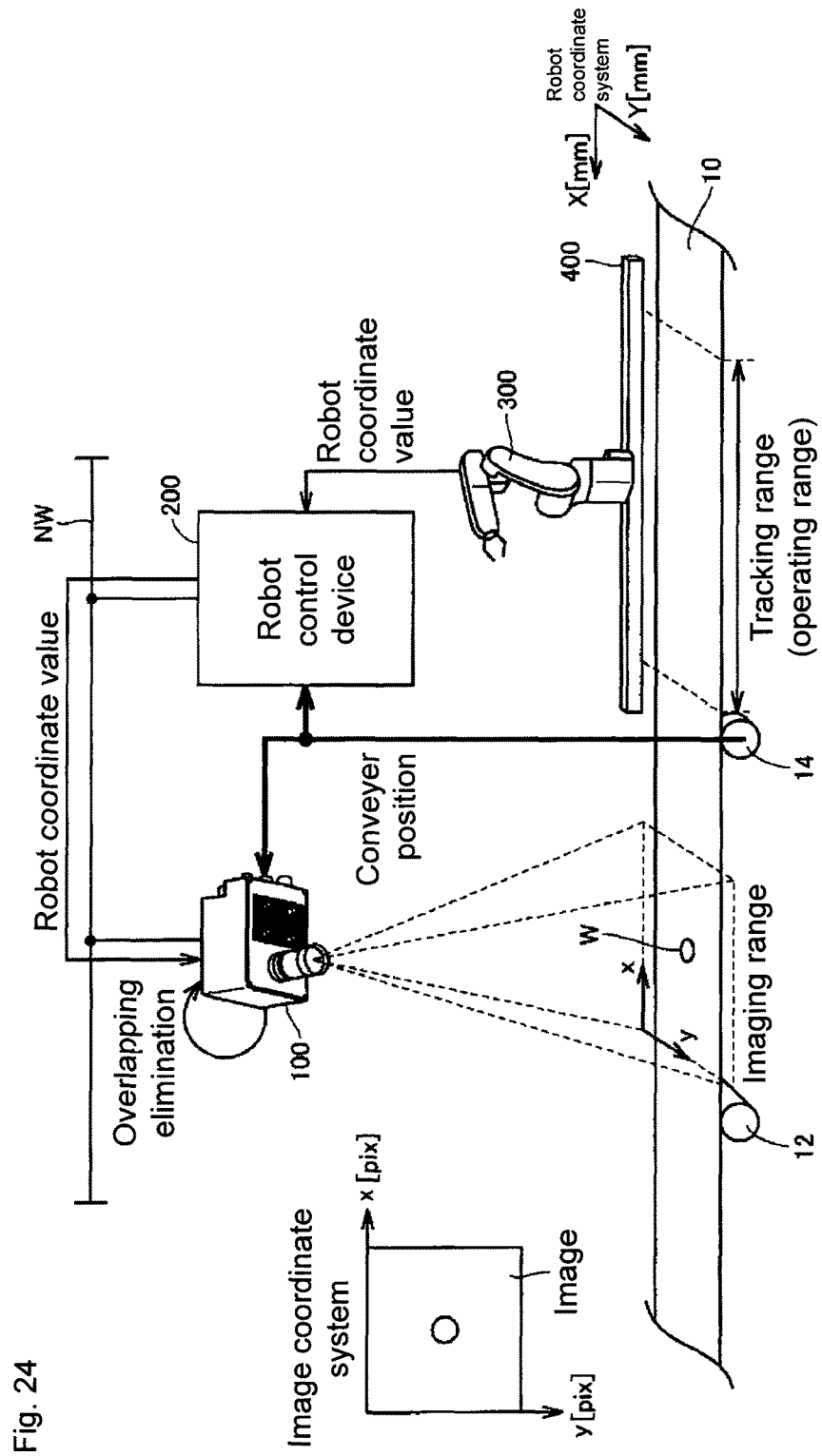
FIG. 24 is a view illustrating a calibration according to a third embodiment of the invention.
Figure 26:
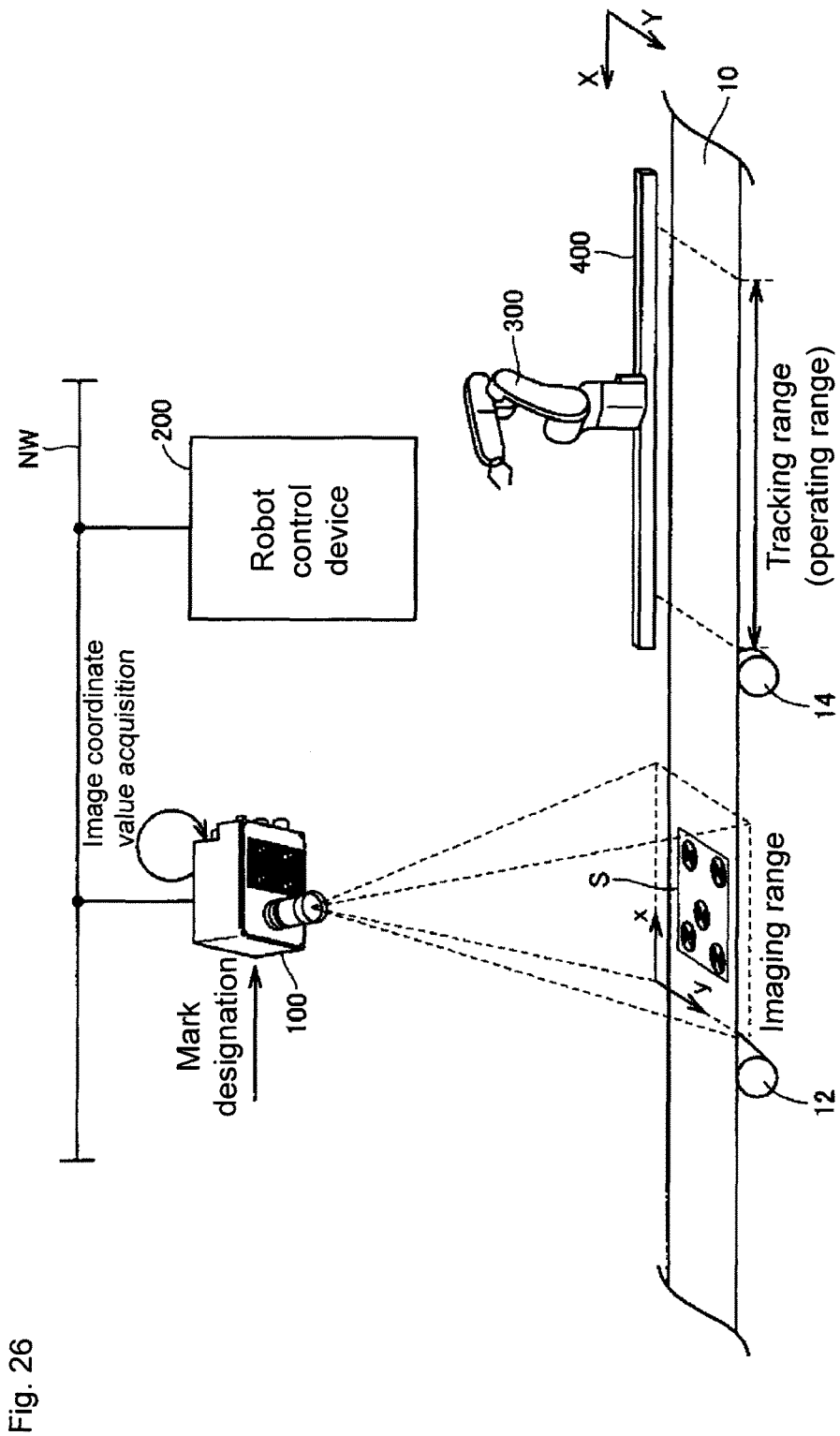
FIG. 26 is a view illustrating a procedure of the calibration according to the third embodiment of the invention.
Figure 27:
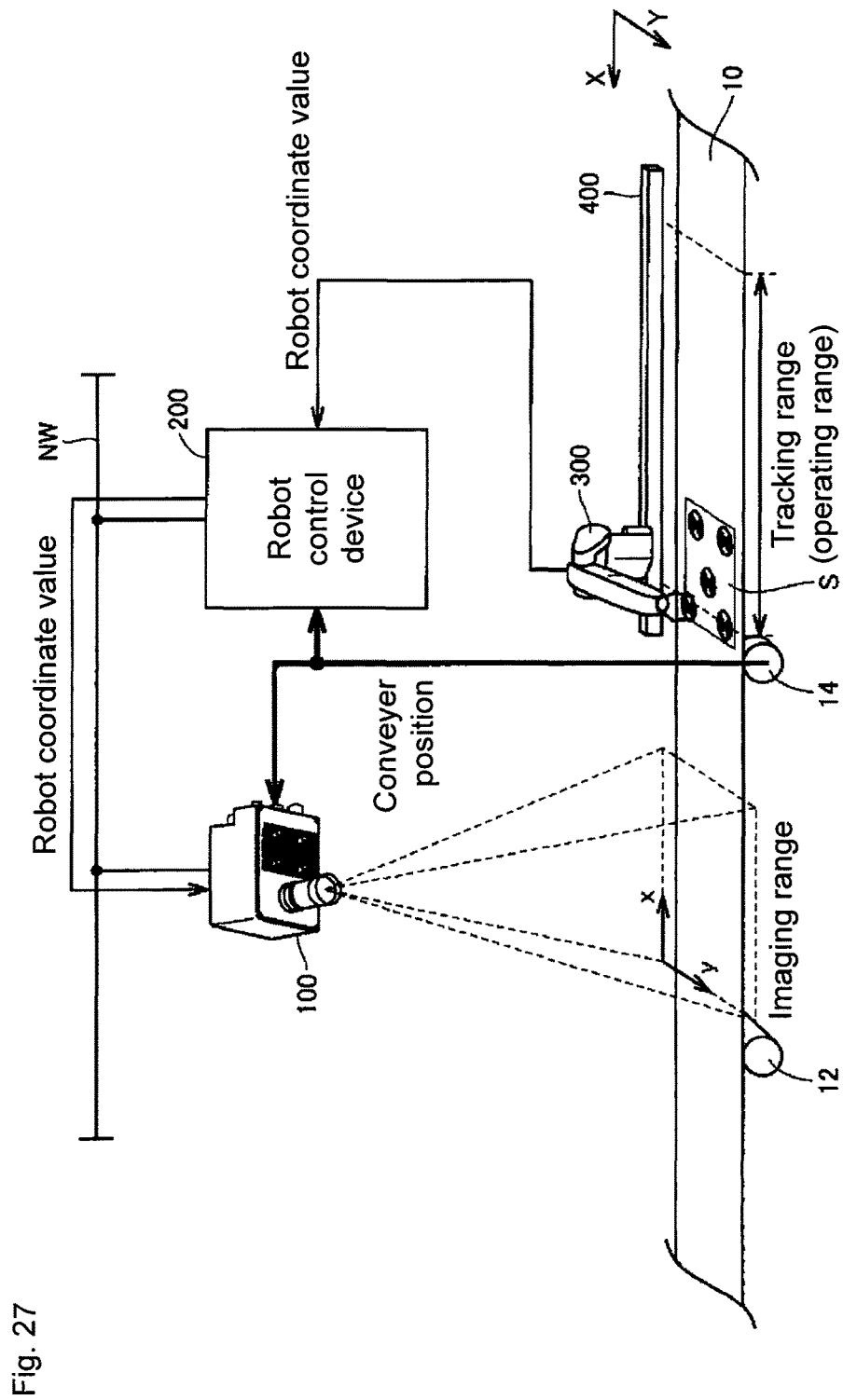
FIG. 27 is a view illustrating the procedure of the calibration according to the third embodiment of the invention.
Figure 28:
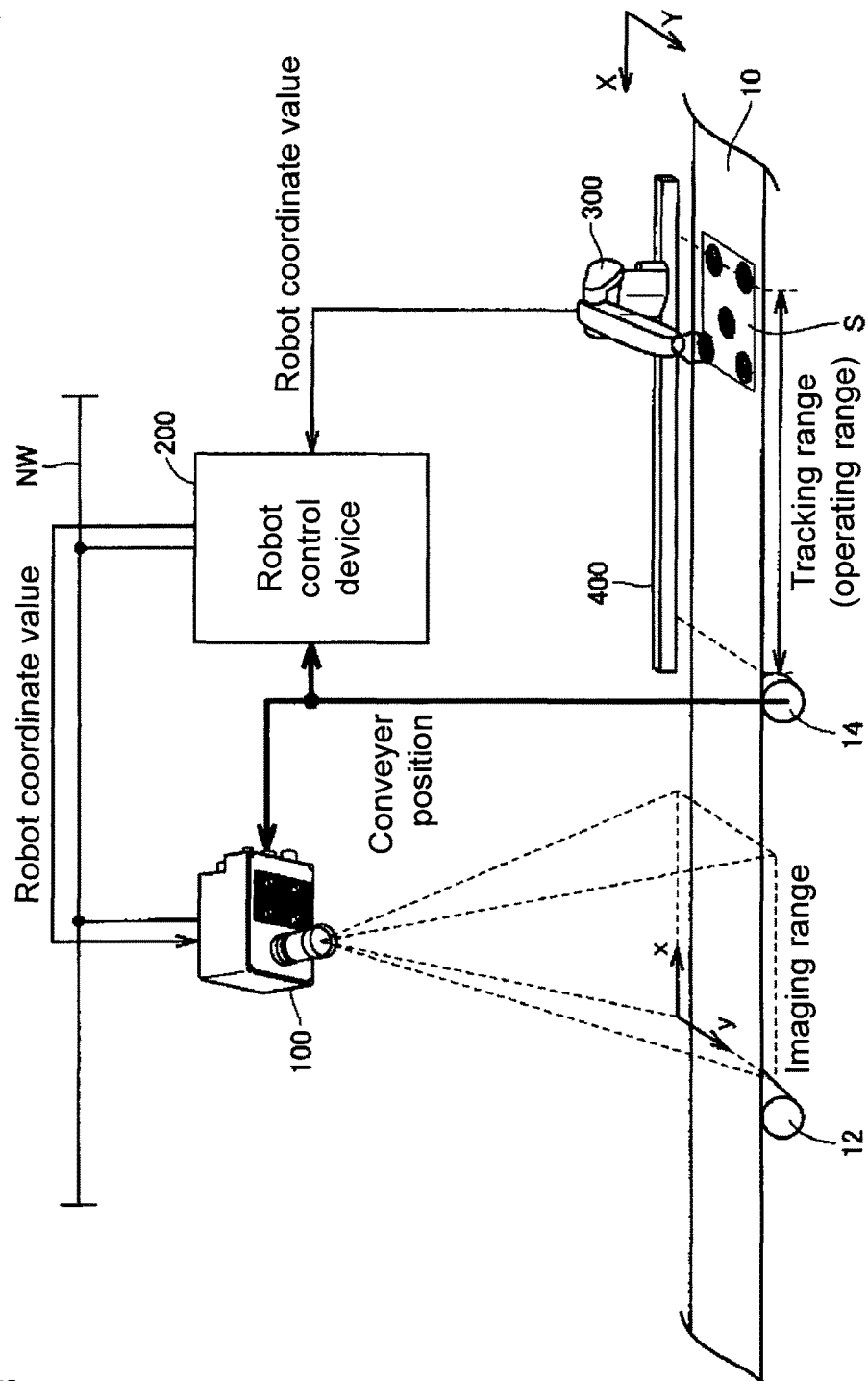
FIG. 28 is a view illustrating the procedure of the calibration according to the third embodiment of the invention.

FIG. 24 is a view illustrating the calibration according to the third embodiment of the invention. FIG. 25 is a view illustrating an example of a parameter set acquired by the calibration shown in FIG. 24. FIGS. 26 to 28 are views illustrating the procedure of the calibration according to the third embodiment of the invention.

Referring to FIG. 24, in the calibration of the third embodiment, the calibration is mainly performed from the following two viewpoints.

(1) Calibration Between the Robot and the Conveyer:

In this calibration, the conveyer travel distance per pulse included in the pulse signal from the encoder 14 is acquired. The conveyer travel distance corresponds to dX and dY as indicated in the second row from the bottom of FIG. 25. As illustrated in FIG. 25, because the conveyer travel distance is a vector quantity, the value is acquired for each axis of the robot coordinate system. The conveyer travel distance is the parameter that is necessary for the robot 300 to receive the pulse signal from the encoder 14 to track the position of the workpiece on the conveyer 10.

(2) Calibration Between the Visual Sensor and the Robot:

A relational expression is acquired that converts positional information (a coordinate value (xi, yi) [pixel] of the image coordinate system) on the workpiece measured by the visual sensor 100 into a coordinate value (X, Y) [mm] of the robot coordinate system. The relational expression is defined by six parameters A to F as indicated at the bottom row in FIG. 25.

As illustrated in FIG. 24, because the positional information (a robot coordinate value) on the robot 300 is necessary to perform the calibration, the positional information is transferred to the visual sensor 100 from the robot control device 200 through the network NW.

The calibration procedure will be described in detail below. In the conveyer system of the third embodiment, even if the user does not understand the meaning of the calibration, the user can easily perform the calibration only by performing the operation according to the designated procedure. More specifically, the calibration of the third embodiment is performed by a three-stage procedure illustrated in FIGS. 26 to 28.

A calibration sheet S in which a target pattern, illustrated at the top portion in FIG. 25, is drawn is used in the calibration of the third embodiment. The target pattern illustrated in the calibration sheet S includes five circles (marks) in each of which the inside is two-toned by about 90°. The calibration is basically performed using the four marks as described later. The additionally-disposed mark is used to align the calibration sheet S with a predetermined direction.

(First Stage)

At a first stage, as illustrated in FIG. 26, the user disposes the calibration sheet S, on which the target pattern is drawn, in the visual field of the visual sensor 100 (the imaging unit 110). The user provides the imaging instruction to the visual sensor 100. The visual sensor 100 performs the measurement processing to the image (which includes the target pattern as the subject) obtained by the imaging, and determines a coordinate value of the center point of each of the four marks disposed at four corners included in the target pattern. Therefore, the coordinate value [pixel] of the image coordinate system is acquired for each of the four marks included in the target pattern. The four acquired coordinate values correspond to (xi1, yi1), (xi2, yi2), (xi3, yi3), and (xi4, yi4), as indicated at the top left portion of FIG. 25.

(Second Stage)

At a second stage, as illustrated in FIG. 27, the user moves the conveyer 10 to dispose the calibration sheet S in which the target pattern is drawn within the tracking range (the operating range) of the robot 300, and operates the robot 300 to obtain the positional relationship between the four marks included in the target pattern and the robot 300.

More specifically, the user moves the conveyer 10 to dispose the calibration sheet S within the tracking range (the operating range) of the robot 300. It is assumed that the count value before the movement of the conveyer 10 (at the beginning of the calibration) is previously acquired. The count value corresponds to an encoder count value E1 (at the beginning of the calibration), as indicated in the second row from the top in FIG. 25.

Then, by operating a teaching pendant (not illustrated) attached to the robot control device 200, the user positions a front end of a hand of the robot 300 such that the front end of the hand of the robot 300 is opposed to one of the marks on the calibration sheet S. The user provides the instruction in the positioned state to transmit the positional information (the coordinate value of the robot coordinate system indicating the position of the front end of the hand of the robot 300) on the robot 300, which is possessed by the robot control device 200, to the visual sensor 100. The process of positioning the front end of the hand of the robot 300 to transmit the positional information on the robot 300 to the visual sensor 100 is repeatedly performed to all the four marks included in the target pattern.

The positional information on the robot 300 corresponding to each of the four marks included in the target pattern is acquired by the above procedure. The pieces of positional information on the robot 300 corresponding to the acquired four marks correspond to (X1, Y1), (X2, Y2), (X3, Y3), and (X4, Y4), as indicated in the third row from the top in FIG. 25.

As illustrated in FIG. 27, the state in which the calibration sheet S is disposed within the tracking range (the operating range) of the robot 300 is maintained until the pieces of positional information on the robot 300 corresponding to the four marks are transmitted to the visual sensor 100.

The count value in the state of FIG. 27 is also stored in the visual sensor 100. The count value corresponds to an encoder count value E2 (when the conveyer is moved to the robot operating range (the upstream side)) indicated in the second top portion of FIG. 25.

(Third Stage)

At a third stage as illustrated in FIG. 28, the user further moves the conveyer 10 to dispose the calibration sheet S to the most downstream position in the tracking range (the operating range) of the robot 300, and operates the robot 300 to obtain the positional relationship between the one mark included in the target pattern and the robot 300.

More specifically, the user moves the conveyer 10 to dispose the calibration sheet S in the position of the end portion on the downstream side in the tracking range (the operating range) of the robot 300.

Then, by operating the teaching pendant (not illustrated), the user positions the front end of the hand of the robot 300 such that the front end of the hand of the robot 300 is opposed to the first mark (the mark in which the coordinate value (X1, Y1) is acquired at the second stage) on the calibration sheet S. The user provides the instruction in the positioned state to transmit the positional information (the coordinate value of the robot coordinate system indicating the position of the front end of the hand of the robot 300) on the robot 300, which is possessed by the robot control device 200, to the visual sensor 100.

The positional information on the robot 300 corresponding to the first mark included in the target pattern is acquired by the above procedure. The positional information on the robot 300 corresponding to the acquired first mark corresponds to (X5, Y5), as indicated in the fourth top portion of FIG. 25.

The count value in the state of FIG. 28 is also stored in the visual sensor 100. The count value corresponds to an encoder count value E3 (when the conveyer is moved to the robot operating range (the downstream side)), as indicated in the second top portion of FIG. 25.

(Parameter Calculation Processing)

Workpiece travel distances dX and dY per count from the encoder 14 are calculated using the parameters acquired by the pieces of processing at the first to third stages. More specifically, the workpiece travel distances dX and dY are calculated according to the following equations.

$$dX=(X5-X1)/(E3-E2)$$

$$dY=(Y5-Y1)/(E3-E2)$$

These equations mean that a change amount of the positional information of the robot 300 to a change amount of the count value, which is generated when the front end of the hand of the robot 300 is positioned to the identical mark in the calibration sheet S, is calculated between the state in FIG. 27 and the state in FIG. 28. The workpiece travel distances dX and dY per count are determined by the calculation equations. That is, the calibration between the robot and the conveyer is performed.

The six parameters A to F of the conversion formulas related to the conversion of the coordinate system are determined based on a correspondence relationship between the coordinate values (xi1, yi1), (xi2, yi2), (xi3, yi3), and (xi4, yi4) of the camera coordinate system acquired in FIG. 26 and the coordinate values (X1, Y1), (X2, Y2), (X3, Y3), and (X4, Y4) of the robot coordinate system acquired in FIG. 27. That is, the parameters A to F satisfying the following equations (or in which an error is minimized) are determined using a well-known technique.

$$X=A \cdot xi+B \cdot yi+C$$

$$Y=D \cdot xi+E \cdot yi+F$$

Therefore, the calibration between the visual sensor and the robot are performed.

When the parameters A to F are determined, the CPU 122 may convert the panoramic image of the camera coordinate system into the coordinate value of the robot coordinate system using the parameters A to F. Therefore, the disposition of the workpiece W on the conveyance path can be presented to the operator at the time when the robot 300 holds the workpiece W.

More specifically, each workpiece position (coordinate value) indicated by the measurement result 334 of the panoramic image data 332 is converted into the coordinate value of the robot coordinate system using the parameters A to F, and the image 60 of each workpiece is displayed in the panoramic image according to the post-conversion coordinate value. Therefore, the disposition of the workpiece W on the conveyance path can be presented at the time when the robot 300 holds the workpiece W.

All the functions described in the above embodiments can be incorporated in the captured image processing unit 120 and the operation display device 500. Alternatively, the necessary functions may be selected and incorporated in the captured image processing unit 120 and the operation display device 500.

Fourth Embodiment

The support device 600 that is connected to the visual sensor 100 and the robot control device 200 through the network NW will be described below.

Figure 29:
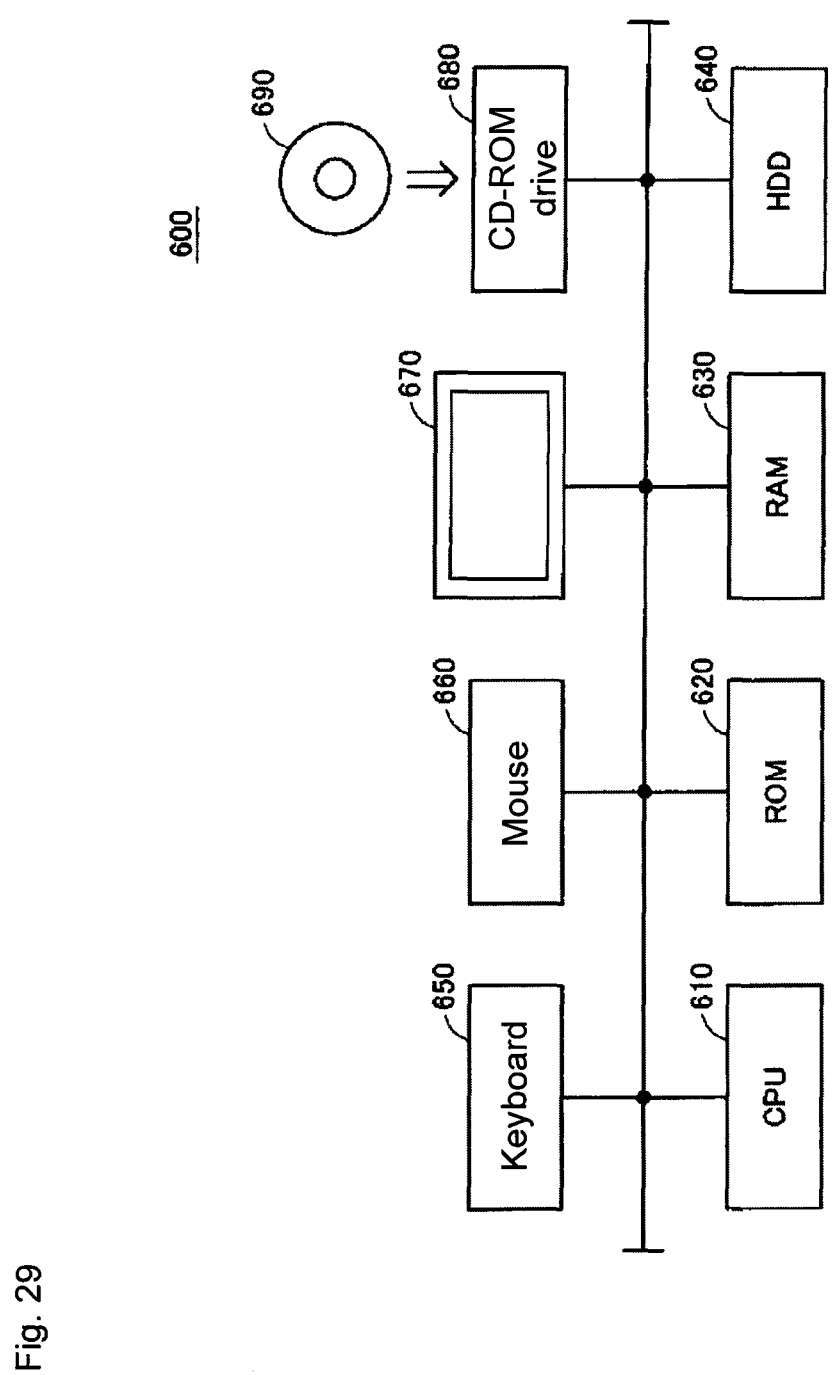
FIG. 29 is a schematic diagram illustrating a hardware configuration of a support device 600 according to a fourth embodiment of the invention.

FIG. 29 is a schematic diagram illustrating a hardware configuration of a support device 600 according to a fourth embodiment of the invention. Typically, the support device 600 is constructed by a general-purpose computer. Preferably the support device 600 is constructed by a notebook personal computer having excellent portability from the viewpoint of maintenance.

Referring to FIG. 29, the support device 600 includes a CPU 610 that executes various programs including the OS (Operating System), a ROM (Read Only Memory) 620 in which the BIOS and various pieces of data are stored, a memory RAM 630 that provides a working area in which the data necessary for the CPU 61 to execute the program is stored, and a hard disk drive (HDD) 640 in which the program and the like executed by the CPU 61 are stored in a nonvolatile manner.

The support device 600 also includes a keyboard 650 and a mouse 660, which receive the operation from the user, and a monitor 670 that presents the information to the user.

As described later, various programs executed by the support device 600 are distributed while stored in a CD-ROM 690. The program stored in the CD-ROM 690 is read by a CD-ROM (Compact Disk-Read Only Memory) drive 68, and stored in the hard disk drive (HDD) 640. Alternatively, the program may be downloaded from the upper-level host computer through the network.

As described above, because the support device 600 is constructed by the general-purpose computer, the detailed description is not repeated.

Because the support device 600 can conduct data communication with both the visual sensor 100 and the robot control device 200, the support device 600 can collect various pieces of data. The support device 600 may have the function related to the panoramic image display of the operation display device 500.

The table 331 in which the measurement result of each piece of image data 333 is stored can be used in order to analyze the action of the robot 300. That is, the robot action is recorded in the robot 300 while correlated with the counter value, which allows the robot action to be correlated with the measurement result 334 of the image corresponding to the robot action. Therefore, for example, in the case where the robot 300 fails in the holding action, the image of the workpiece that is of the holding target and the measurement result 334 can be reproduced on the support device 600 or the operation display device 500 in order to pursue a cause of the failure. Therefore, the cause of the failure can easily be analyzed, or the information assisting the analysis can be presented.

It is to be noted that the disclosed embodiments are illustrative and not restricted. The scope of the invention is not defined by the above description but rather by the claims, and the meanings equivalent to the claims and all the changes within the claims are included in the invention.

EXPLANATION OF REFERENCE NUMERALS 10,20 conveyer
100 visual sensor
110 imaging unit
120 captured image processing unit
126 image control unit
132 encoder counter
200 robot control device
510 computation processing unit
221 measurement processing unit
222 overlapping acquisition unit
223 image generation unit
225 ratio acquisition unit
226 parameter update unit
227 measurement parameter update unit
228 imaging parameter update unit
229 image division unit
300 robot
500 operation display device
600 support device
NW network
S calibration sheet
W workpiece

The invention claimed is:

1. An image processing device for a conveyor tracking system, the conveyor tracking system comprising:
   at least one conveying device provided with an encoder generating a signal indicating a travel distance of the at least one conveying device; and
   an imaging unit connected to the image processing device, the imaging unit continuously capturing a plurality of images in an imaging range, a period of the imaging unit set such that each of the plurality of images includes an overlapping region of a captured image in the imaging range captured before and after each image captured during the continuous capturing;
   the image processing device comprising:
   a first interface that receives the plurality of captured images obtained by the imaging unit;
   a second interface that receives the signal generated by the encoder;
   a measurement unit that acquires a measurement result of a subject in a captured image by performing measurement processing on the captured image;
   a synthesis unit that generates a synthesized image by overlapping the plurality of captured images based on a value calculated from the signal generated by the encoder such that the captured images overlap with one another within an overlapping range corresponding to the overlapping region in an imaging order and the synthesized image is generated by the synthesis unit from images of the plurality of captured images and the overlapping regions before and after each of the images of the plurality of captured images superimposed thereon; and
   an output unit that outputs the synthesized image, information indicating the overlapping regions correlated with the synthesized image, and information indicating the measurement result, wherein the output unit outputs the synthesized image, the information indicating the overlapping regions correlated with the synthesized image and the information indicating the measurement result including highlighting the information indicating the overlapping regions correlated with the synthesized image by one of a thick-line frame or a color for the overlapping regions to be displayed on the synthesized image, wherein
   the output unit varies an output mode of each captured image in the synthesized image between at least a first output mode and a second output mode associated with the calculated value, such that no two consecutive images are output with the same output mode; and the first output mode comprises a first background color and the second output mode comprises a second background color different from the first background color.

2. The image processing device according to claim 1, further comprising an operation input unit that externally receives an operation to select a captured image of the plurality of captured images and to designate a measurement result corresponding to the captured image, wherein the output unit enlarges and outputs the captured image selected by the operation input unit in the synthesized image.

3. The image processing device according to claim 2, further comprising a selection unit that selects the measurement result that is designated by the operation received by the operation input unit from measurement results corresponding to the captured images, wherein the output unit outputs the synthesized image, the synthesized image including the captured image corresponding to the measurement result selected by the selection unit and captured images captured before and after the selected captured image.

4. The image processing device according to claim 1, wherein the output unit:

selects, from the captured images in the synthesized image, a captured image corresponding to a previously specified measurement result; and outputs the selected captured image.

5. The image processing device according to claim 1, wherein the output unit differentiates an output mode of the measurement result corresponding to odd-numbered captured images from an output mode of the measurement result corresponding to even-numbered captured images in the captured images in the synthesized image.

6. The image processing device according to claim 1, wherein the output unit outputs information on a time necessary for the measurement processing performed by the measurement unit.

7. The image processing device according to claim 6, wherein the information on the time necessary is a ratio of a time necessary for the captured image measurement processing to a time interval before and after the continuous capturing.

8. The image processing device according to claim 7, wherein the ratio is acquired with respect to each captured image of the synthesized image, and the ratio is output while correlated with the synthesized image and with each captured image of the synthesized image.

9. A non-transitory computer readable medium storing an image processing program for a conveyor tracking system, the conveyor tracking system comprising:

at least one conveying device with an encoder generating a signal indicating a travel distance of the at least one conveying device; and an imaging unit, connected to a computer to execute the image processing program, the imaging unit continuously capturing a plurality at images in an imaging range, a period of the imaging unit set such that each of the plurality of images includes an overlapping region of a captured image in the imaging range captured before and after each image captured during the continuous capturing, wherein the image processing program causes the computer to perform operations comprising:

receiving at a first interface, the plurality of captured images obtained by the imaging unit;

receiving at a second interface, the signal generated by the encoder;

acquiring a measurement result of a subject in the captured image by performing measurement processing on the captured image;

generating a synthesized image by overlapping the plurality of captured images based on a value calculated from the signal such that the captured images overlap with one another within an overlapping range corresponding to the overlapping region in imaging order and the synthesized image is generated from images of the plurality of captured images and the overlapping regions before and after each of the images of the plurality of captured images superimposed thereon; and outputting the synthesized image, information indicating the overlapping regions correlated with the synthesized image, and information indicating the measurement result, wherein outputting the synthesized image comprising outputting the synthesized image, the information indicating the overlapping regions correlated with the synthesized image and the information indicating the measurement result including highlighting the information indicating the overlapping regions correlated with the synthesized image by one of a thick-line frame or a color for the overlapping regions to be displayed on the synthesized image, the output unit varies an output mode of each captured image in the synthesized image between at least a first output mode and a second output mode associated with the calculated value, such that no two consecutive images are output with the same output mode; and the first output mode comprises a first background color and the second output mode comprises a second background color different from the first background color.

10. The image processing device according to claim 1, wherein the value comprises a deviation amount between counter values for adjacent images of the plurality of captured images;

the synthesis unit generates the synthesized image by synthesizing the plurality of captured images based on the deviation amount.

11. The non-transitory computer-readable medium according to claim 9, wherein outputting the synthesized image comprises varying an output mode of each captured image in the synthesized image, such that no two consecutive images are output with the same output mode.

12. The non-transitory computer-readable medium according to claim 9, the operations further comprising:

externally receiving, at an operation input unit, an operation to select a captured image of the plurality of captured images and to designate a measurement result corresponding to the captured image;

enlarging, with the output unit, the captured image selected by the operation input unit in the synthesized image; and outputting, with the output unit, the enlarged image.

13. The non-transitory computer-readable medium according to claim 12, the operations further comprising:

selecting, with a selection unit, the measurement result that is designated by the operation received by the operation input unit from measurement results corresponding to the captured images; and outputting, with the output unit, the synthesized image wherein the synthesized image includes the captured image corresponding to the measurement result selected by the selection unit and captured images captured before and after the selected captured image.

14. The non-transitory computer-readable medium according to claim 9, the operations further comprising:
   selecting from the captured images in the synthesized image, with the output unit, a captured image corresponding to a previously specified measurement result; and
   outputting, with the output unit, the selected captured image.

15. The non-transitory computer-readable medium according to claim 9, the operations further comprising differentiating, with the output unit, an output mode of the measurement result corresponding to odd-numbered captured images from an output mode of the measurement result corresponding to even-numbered captured images in the captured images in the synthesized image.

16. The non-transitory computer-readable medium according to claim 9, the operations further comprising outputting, with the output unit, information on a time necessary for the measurement processing performed by the measurement unit.

17. The non-transitory computer-readable medium according to claim 16, wherein the information on the time necessary is a ratio of a time necessary for the captured image measurement processing to a time interval before and after the continuous capturing.

18. The non-transitory computer-readable medium according to claim 17, wherein the ratio is acquired with respect to each captured image of the synthesized image, and the ratio is output while correlated with the synthesized image and with each captured image of the synthesized image.

* * * * *